United States Patent [19]

Kondo et al.

[11] Patent Number: 5,737,051
[45] Date of Patent: Apr. 7, 1998

[54] LIQUID CRYSTAL DISPLAY DEVICE

[75] Inventors: Katsumi Kondo, Katsuta; Hiromu Terao, Mito; Hidetoshi Abe; Masuyuki Ohta, both of Katsuta, all of Japan; Kenkichi Suzuki, Oxford, United Kingdom; Tohru Sasaki; Genshiro Kawachi, both of Hitachi, Japan; Junichi Ohwada, Mobara, Japan

[73] Assignee: Hitachi, Ltd., Tokyo, Japan

[21] Appl. No.: 744,451

[22] Filed: Nov. 6, 1996

Related U.S. Application Data

[63] Continuation of Ser. No. 123,472, Sep. 20, 1993, Pat. No. 5,598,285.

[30] Foreign Application Priority Data

Sep. 18, 1992 [JP] Japan ................................ 4-249938
Jan. 20, 1993 [JP] Japan ................................ 5-007355

[51] Int. Cl.⁶ ........................ G02F 1/1343; G02F 1/136
[52] U.S. Cl. ........................ 349/141; 349/39; 349/42; 349/19; 349/143
[58] Field of Search ........................ 349/123, 19, 138, 349/39, 42, 136, 141, 139, 143

[56] References Cited

U.S. PATENT DOCUMENTS 3,674,342 7/1972 Castellano et al.
3,774,989 11/1973 Takahashi.
4,345,249 8/1982 Togashi ........................ 359/59
5,365,079 11/1994 Kodaiva et al. ........................ 359/59

FOREIGN PATENT DOCUMENTS 53-77646 7/1978 Japan.
54-36752 3/1979 Japan.
54-43048 4/1979 Japan.

Primary Examiner—Anita Pellman Gross
Assistant Examiner—Kenneth L. Parker
Attorney, Agent, or Firm—Antonelli, Terry, Stout, & Kraus, LLP

[57] ABSTRACT

The liquid crystal display device has a plurality of pixel elements, the optical transmissivity of which is varied by suitable electrical signals. The liquid crystal display device has electrodes which apply electric fields to a liquid crystal layer, the electric fields having components in a direction generally parallel to the liquid crystal layer. Each pixel element has at least one pixel electrode which extends in a common direction as signal electrodes and common electrodes which extend over several pixel elements. The common electrodes may be on the same side of the liquid crystal layer as the pixel and signal electrodes, or they may be on opposite sides. Each pixel may have two pixel electrodes with the signal electrode therebetween and there are then a pair of common electrodes with the pixel electrodes therebetween. The common electrodes may be common to adjacent pixel elements. The pixel electrodes and the common electrodes may be separated by an insulating film.

13 Claims, 14 Drawing Sheets

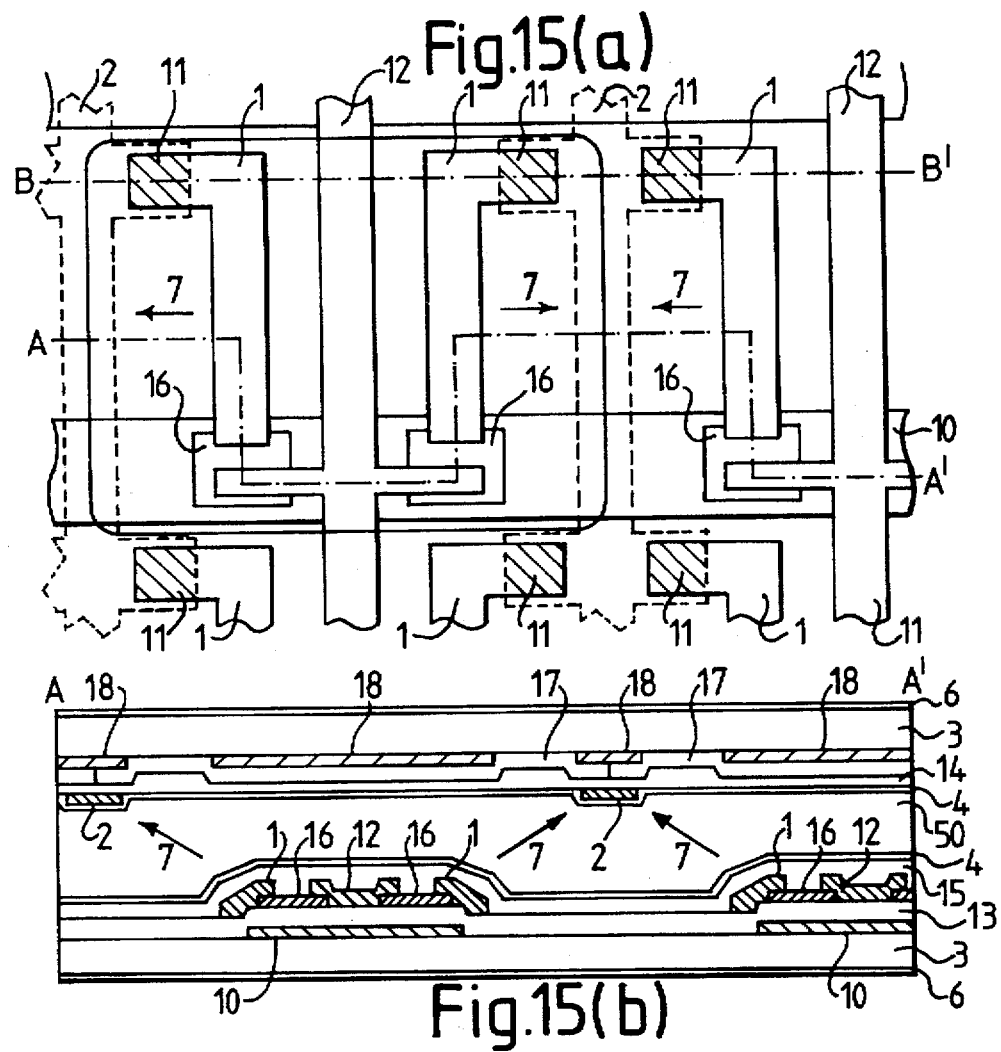
Fig.15(a)
Fig.15(b)
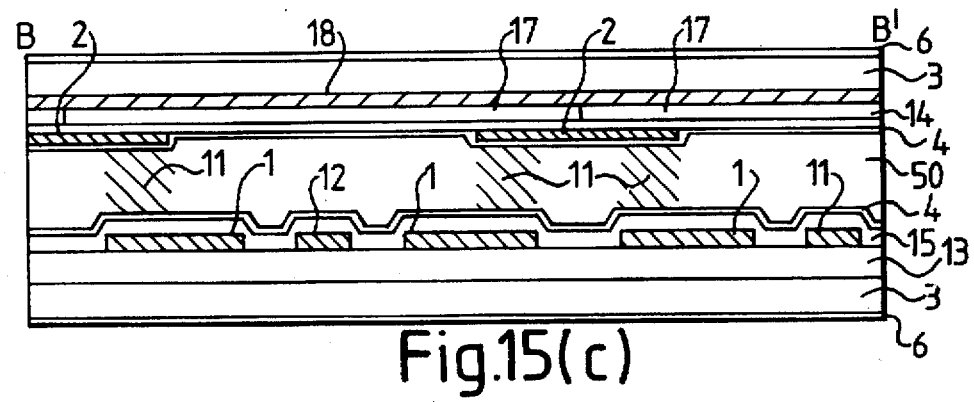
Fig.15(c)

LIQUID CRYSTAL DISPLAY DEVICE

This application is a continuation of application Ser. No. 08/123,472, filed Sep. 20, 1993, now U.S. Pat. No. 5,598,285.

BACKGROUND OF THE INVENTION

1. Field of the Invention

The present invention relates to a liquid crystal display device having at least one, preferably a plurality of pixel elements.

2. Description of the Prior Art

In standard liquid crystal display device, the pixel element is a liquid crystal layer (normally common to the pixel elements) extending in a plane, and there is at least one polarizing means parallel to the plane of the liquid crystal layer. By applying electrical signals to the liquid crystal layer using suitable electrodes, it is possible to vary the angle of polarization of polarized light passing through the liquid crystal layer. Thus, by changing those electrical signals, it is possible to vary the optical transmissivity of a liquid crystal display device by varying the change in polarization relative to the at least one polarizing means. Normally, in such a liquid crystal display device, the polarizing means is formed by two polarizing plates, one on each side of the liquid crystal layer, but is also possible to provide an arrangement with a single polarizing plate on one side of the liquid crystal layer, and a reflective element on the other side of the liquid crystal element.

In standard liquid crystal display devices, electrical fields are generated by the electrodes perpendicular to the plane of the liquid crystal layer. Therefore if the change in the liquid crystal layer due to the electric fields is to be visible, the extent of those electrodes needs to be large, and therefore it is necessary to use transparent electrodes. Furthermore, at least two layers are normally needed between the transparent electrodes on each side of the liquid crystal layer and the liquid crystal layer itself. One layer forms an orientation layer for the liquid crystal layer, but a further insulating layer is then needed between the orientation layer and the transparent electrode.

In International Patent Application No. PCT WO91/10936, a liquid crystal display device was disclosed in which electrical signals were applied to the liquid crystal layer so as to generate electric fields having components in a direction parallel to the plane of the liquid crystal layer. Such parallel field components cause reorientation of the molecules of the liquid crystal layer, thereby varying the optical transmissivity of the liquid crystal display device.

In PCT WO91/10936, it was proposed that the electrodes for applying such field were, for each pixel element, in the form of combs, the teeth of the comb formed by one electrode extending into the spaces between the teeth of the comb formed by the other electrode. The teeth of each electrode were electrically connected in common, and a voltage was applied between the electrodes.

JP-B-63-21907(1988) also disclosed a liquid crystal display device in which electrical signals were applied to the liquid crystal layer so as to generate electric fields having components in a direction parallel to the plane of the liquid crystal layer. As in PCT WO91/10936, the electrodes for applying such fields were, for each pixel element, in the form of combs. Use of comb-shaped electrodes was also disclosed in US Patent Specification No. 4,345,249.

In each of these known arrangements, each pixel element thus has first and second electrodes of comb shape, with the teeth of one comb extending between the teeth of the other comb. Voltages are then applied to the electrodes by a suitable control circuit. It is important to note that the teeth of the comb-shaped electrodes are not electrically independent, so that size of the pixel is determined by the size of the comb-shaped electrode.

The principles of operation of such devices, with comb shaped electrodes, is also discussed in an article entitled "Field Effects In Nematic Liquid Crystals Obtained With Interdigital Electrodes" by R. A. Sorer in the Journal of Applied Physics, pages 5466 to 5468, vol. 45, no. 12 (December 1974), and in article entitled "Interdigital Twisted-Nematic-Displays" by R. A. Soref published in the Proceedings of the IEEE, pages 1710 to 1711 (December 1974).

SUMMARY OF THE PRESENT INVENTION

In the standard liquid crystal display devices discussed above, it is necessary to use transparent electrodes, which are formed on facing surfaces of two substrates. However in order to form such transparent electrodes, it is necessary to use a vacuum manufacturing operation, such as sputtering, and thus the cost of manufacture of such standard liquid crystal display devices is high. Furthermore, it has been found that such transparent electrodes have vertical geometrical irregularities, of the order of several tens of nanameters, this prevent precise manufacture of active devices, such as thin film transistors needed to control the signals to the electrodes. Also, it has been found that parts of such transparent electrodes may come detached, to cause point or line defects. Thus, it has proved difficult to manufacture both reliably and cheaply liquid crystal devices.

Such conventional liquid crystal display devices also have disadvantages in terms of picture quality. The problem of vertical geometrical irregularities in the transparent electrodes has been mentioned above, but similar irregularities around the controlling transistors may result in orientation failure domains being formed, requiring light shielding film to cover such transistor devices, using the light utilisation efficiency of the liquid crystal device. Also, such conventional liquid crystal display devices have disadvantage that their significant change in brightness when the visual angle is changed, and reversion of some gradation levels can occur in a half-term display, at some view angles.

Although the use of comb shaped electrodes, such as previously discussed, prove the need for transparent electrodes, further problems have been found. While the use of such comb-shaped electrodes offers theoretical advantages, those are limited by practical consideration which have to be taken into account when the comb-shaped electrodes are used. If the teeth of such comb-shaped electrodes have a width of 1 to 2 micrometers, satisfactory practical operation can be achieved. However, it is extremely difficult to form such fine teeth over a large substrate without defects. Thus, in practice, the aperture factor of the liquid crystal display device is reduced, because of the need to provide relatively wide electrode teeth. There is thus a trade-off between aperture factor and production yield, which is undesirable.

Therefore, the present invention seeks to provide a liquid crystal display device which is more suitable for mass production than the known liquid crystal display devices discussed above. The present invention has several aspects.

In the liquid crystal display device according to the present invention there are features which are common to all the aspects. The device has a liquid crystal layer, and at least one polarizing means, which is normally a pair of polarizing plates on opposite sides of the liquid crystal layer. The device has at least one, normally a plurality, of pixel elements and there are electrodes which receive electrical signals for controlling the optical transmissivity of light through the device. As in e.g. JP-B-63-21907 (1988) discussed above, the electrical signals are applied such that electrical fields are generated in the liquid crystal layer with components parallel to the plane of the liquid crystal layer. The various aspects of the present invention, which will be discussed below, then relate to the electrode arrangement of a pixel element(s) and also to the materials and optical arrangements of the materials of the liquid crystal display device.

In a first aspect of the present invention, each pixel element has a pixel electrode extending in a first direction within the pixel, and there are also signal wiring electrodes extending in the same direction over several of the pixel elements. There are also common electrodes extending in that first direction over more than one of the pixel elements.

There may be a pair of pixel electrodes for each pixel element, with the signal wiring electrodes then extending between a pair of pixel electrodes at each pixel element. There is then a pair of common electrodes, with the pair of pixel electrodes being therebetween, so that electrical fields are generated in opposite directions for each pixel element.

Preferably, all the electrodes are on the same side of the liquid crystal layer. Arrangements are also possible, however, in which the common electrodes are on the opposite side of the liquid crystal layer of the other electrodes. In either case, if there is insulating material between the common electrode and the pixel electrode for each pixel element, a capacitive device may be formed therebetween.

In practice, it is possible for the common electrodes to be in common for two adjacent pixel elements, by interacting with pixel electrodes on opposite sides of each common electrode.

In a second aspect of the present invention, each pixel can be considered to have a elongate transistor element extending in a first direction, that elongate transistor element having at least one elongate electrode. There is also at least one elongate common electrode extending in the same direction as the elongate transistor element. In the second aspect, an insulating film separates the at least one elongate electrode of the elongate transistor element and the at least one common electrode.

In a third aspect of the present invention, each pixel has again an elongate transistor element extending in one direction, and at least one elongate common electrode extending in the same direction. The elongate transistor element has at least one elongate electrode, and there is an insulating film extending over and being in direct contact with that at least one elongate electrode. That insulating film is also in direct contact with the liquid crystal layer. Preferably, that insulating film is an organic polymer.

In the fourth aspect of the present invention, each pixel can be considered to have a transistor element with a pair of first electrodes (pixel electrodes), a signal electrode between the first electrodes, and a gate electrode. The first and second electrodes extend in a common direction, as do a pair of common electrodes. A transistor element is then (in plan) between the pair of common electrodes. As has previously been mentioned, the common electrodes and the transistor element may be on the same side of the liquid crystal layer, or may be on opposite sides.

In the fifth aspect one pixel element, each one of said pairs of common electrodes thereof forms a corresponding one of said pair of common electrodes pixel elements adjacent to said any one pixel element.

The five aspects of the present invention discussed above all relate to the electrode arrangement of the liquid crystal display device. The aspects of the invention to be discussed below relate to the optical arrangement and materials of the liquid crystal display device.

In a sixth aspect of the present invention the angles between components of electric fields in a direction parallel to the plane of said liquid crystal layer and the direction of orientation of molecules at opposite surfaces of the liquid crystal layer are the same, and the product of the thickness of the liquid crystal layer and the refractive index anisotropy of the liquid crystal layer is between 0.21 µm and 0.36 µm.

In a seventh aspect of the present invention, the absolute value of the difference between the angles between components of electric fields in a direction parallel, to the plane of said liquid crystal layer and the direction of orientation of molecules at opposite surfaces of the liquid crystal layer is not less than 80° and not greater than 100°, and product of the thickness of the liquid crystal layer and the refractive index anisotropy of the liquid crystal layer is between 0.4 µm and 0.6 µm.

In a eighth aspect of the present invention, dielectric constant anisotropy of the liquid crystal layer is positive, and the absolute value of the angle between components of electric fields in a direction parallel to the plane of said liquid crystal layer and the direction of orientation of molecules at the surface of the liquid crystal layer is less than 90° but not less than 45°.

In a ninth aspect of the present invention, dielectric constant anisotropy of the liquid crystal layer is negative and the absolute value of the angle between components of electric fields in a direction parallel to the plane of said liquid crystal layer and the direction of orientation of molecules at the surface of the liquid crystal layer is greater than 0° but not greater than 45°.

In a tenth aspect of the present invention dielectric constant anisotropy of the liquid crystal layer is positive, and the value of the difference between: i) the angle between components of electric fields in a direction parallel to the plane of said liquid crystal layer and the direction of orientation of molecules at the surface of the liquid crystal layer; and ii) the angle of the polarization axis of said at least one polarizing plate and said components of electric fields in a direction parallel to the plane of said liquid crystal layer, is 3° to 15°.

In a eleventh aspect of the present invention dielectric constant anisotropy of the liquid crystal layer is negative, and the value of the difference between i) the angle of the polarization axis of said at least one polarizing plate and said components of electric fields in a direction parallel to the plane of said liquid crystal layer, and ii) the angle between components of electric fields in a direction parallel to the plane of said liquid crystal layer and the direction of orientation of molecules at the surface of the liquid crystal layer is 3° to 15°.

In an twelveth aspect of the present invention direction of orientation of molecules of said liquid crystal layer at a surface of said liquid crystal layer parallel to the plane of said liquid crystal layer and said surface is not more than 4°.

Although various aspects of the present invention have been discussed above, a liquid crystal display device embodying the present invention may incorporate combinations of such aspects. Depending on the resulting combination, the present invention provides advantages in the manufacture and/or operation of a liquid crystal display device, and these advantages will be discussed in more detail later.

BRIEF DESCRIPTION OF THE DRAWINGS

Embodiments of the present invention will now be described in detail, by way of example, with reference to the accompanying drawings, in which:

FIG. 15(a) is a plan view and FIGS. 15(b) and 15(c) a sectional views of a fourth embodiment in which the capacitive device is formed between a common electrode and the pixel electrode on the respective facing interface of the substrates;

DETAILED DESCRIPTION

Before describing embodiments of the present invention, the general principles underlying the present invention will be explained.

Figure 6:
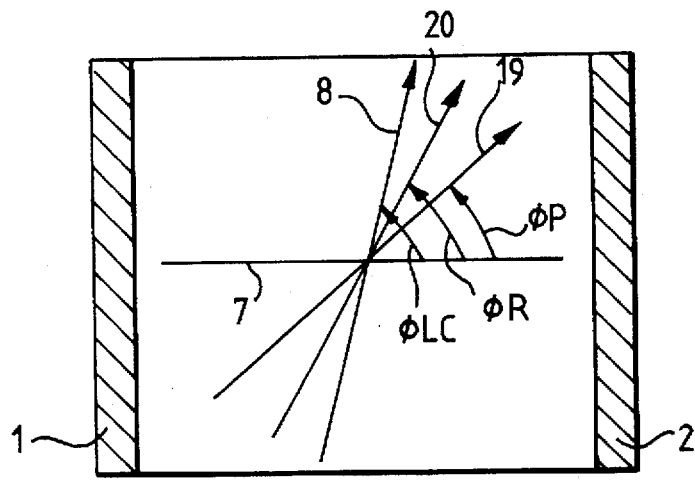
FIG. 6 is a diagram illustrating the angles formed by the long axis orientation direction of the liquid crystal molecules at the interface the polarizing axis of the polarizing plate, and the phase advance axis of the phase difference plate, with respect to the direction of the electric field.

First, suppose that for the angle of a polarized light transmission axis of the polarized plate with respect to the direction of the electric field is the angle of the longitudinal axis (optical axis) of liquid crystal molecules near the interface with respect to the electric field is $\phi_{LC}$, and the angle of the phase advance axis of the phase difference plate inserted between the pair of polarizing plates with respect to the electric field is $\phi_R$, as shown in FIG. 6. Because there are normally pairs of polarizing plates and liquid crystal interfaces, i.e. upper and lower plates and interface, these are represented as $\phi_{P1}$, $\phi_{P2}$, $\phi_{LC1}$, and $\phi_{LC2}$. FIG. 6 corresponds to a top view of FIG. 1, to be described later.

Next, the operation of embodiments of the present invention will be described with reference to FIGS. 1(a) to 1(d).

Figure 1A:
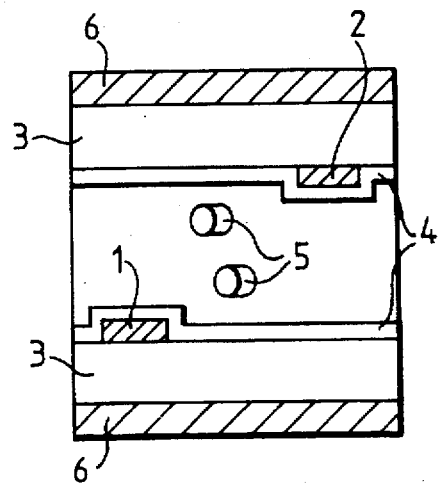
FIGS. 1(a) to 1(d) are schematic diagrams illustrating the behaviour of liquid crystal molecules in a liquid crystal display device according to the present invention.
Figure 1B:
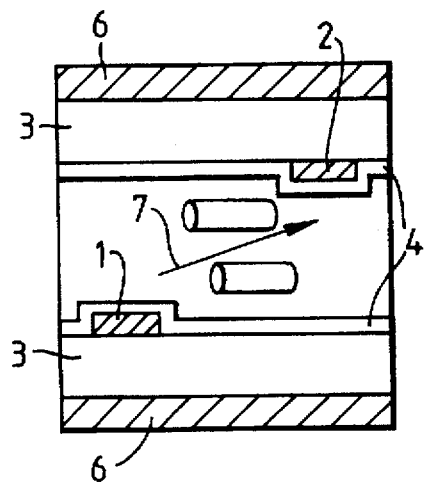
Figure 1C:
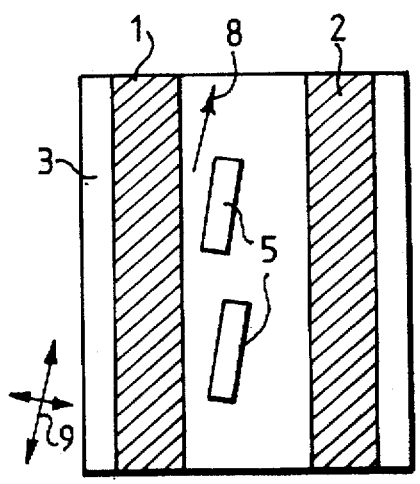
Figure 1D:
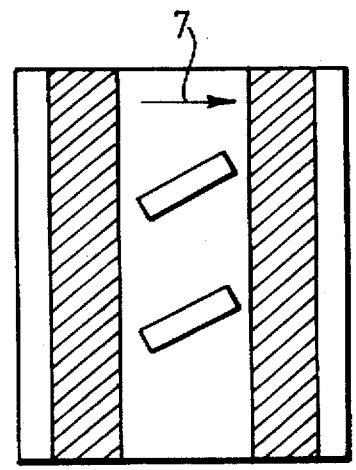

FIGS. 1(a) and 1(b) are side cross sections showing the operation of a liquid crystal display device according to the present invention. FIGS. 1(c) and 1(d) are front views of the liquid crystal display device. In FIGS. 1(a) to 1(d), the thin film transistor device is omitted. In this invention, stripes of electrodes are used to form a plurality of pixels, but the FIGS. 1(a) to 1(d) show the structure of only one pixel (one cell). The side cross section of the cell when no voltage is applied is shown in FIG. 1(a), and the top view is shown in FIG. 1(c).

Linear electrodes 1, 2, are formed on the inner sides of paired transparent substrates 3, over which an orientation control film 4 is applied and subjected to an orientation processing. A liquid crystal is held between the paired substrates 3. Bar shaped liquid crystal molecules 5 of the liquid crystal are oriented so that they are at a slight angle to the longitudinal direction of the electrodes 1, 2, i.e. 45 degrees $\leq \phi_{LC} < 90$ degrees, when no electric field is applied. This discussion assumes that the orientation directions of the liquid crystal molecules on the upper and lower interfaces are parallel to each other, i.e. $\phi_{LC1} = \phi_{LC2}$. It is also assumed that the dielectric constant anisotropy of the liquid crystal is positive.

When an electric field 7 is applied, the liquid crystal molecules 5 change their directions and are aligned with the direction of the electric field 7, as shown in FIGS. 1(b) and 1(d). By arranging the polarizing plates 6 at a specified angle 9, it is possible to change the light transmission factor when the electric field is applied. Thus, it is possible to provide a display having a contrast without using transparent electrodes.

In FIG. 1(b), the angle between the substrate surface and the direction of the electric field looks large and it seems not to be parallel to the substrates. In reality this is the result of magnifying the thickness direction in FIG. 1(b) and the angle is actually less than 20 degrees.

In the following description, the electric fields whose inclination is less than 20 degrees are generally referred to as lateral electric fields. FIGS. 1(a) and 1(b) show an arrangement in which the electrodes 1, 2, are provided separately on the upper and lower substrates respectively. However, it is possible to arrange them on one substrate and produce the same effect. Because the wiring pattern is very fine and may therefore deform due to heat and/or external forces, arranging the electrodes on a single substrate is preferable because it permits more precise alignment.

Although the dielectric constant anisotropy of the liquid crystal is assumed to be positive, it may be negative. In that case, the initial orientation of the liquid crystal is set so that the liquid crystal molecules have a slight angle $|\phi_{LC}|$ (i.e. 0 degree $< |\phi_{LC}| \leq 45$ degrees) with respect to a direction perpendicular to the longitudinal direction of the electrodes 1, 2, (the direction of the electric field Advantages which may thus be achieved with the present invention will now be explained.

(1) The first advantage is that enhanced contrast may be achieved without using transparent electrodes.

There are two types of structure for producing contrast. The one utilizes a mode in which the orientations of the liquid crystal molecules 5 on the upper and lower substrates 3 are almost parallel to each other (since color interface by birefringent phase difference is used, this mode is called a birefringent mode). The other structure has a mode in which the orientations of the liquid crystal molecules 5 on the upper and lower substrates 3 cross each other, twisting the molecular orientation in the cell (since light spiraling produced by rotation of the polarization plane in the liquid crystal composition layer is used, this mode is called a light spiraling mode).

In the birefringent mode, when a voltage is applied, the molecular long axis 8 (optical axis) changes its direction in a plane almost parallel to the substrate interface, changing its angle with respect to the axis of a polarized plate (not shown in FIGS. 1(a) and 1(b)) which is set at a specified angle. This results in a change in the light transmission factor.

In the light spiraling mode, the application of a voltage similarly changes only the direction of the molecular long axis in the same plane. This mode, however, utilizes a change in the light spiraling as the spiral is unraveled.

Next, a structure for making the display colorless and increasing the contrast ratio explained below hereinafter for two cases: one using the birefringent mode and the other using the light spiraling mode.

II. Displaying in birefringent mode: generally, when a uniaxial birefringent medium is inserted between two orthogonal polarizing plates, the light transmission factor, $T/T_O$, is expressed as follows.

$$T/T_i = \sin^2(2\chi_{eff}) \cdot \sin^2(\pi d_{eff} \Delta n / \lambda) \qquad \text{Equation (1)}$$

In Equation 1, $\chi_{eff}$ is the effective direction of light axis of liquid crystal composition layer (an angle between the light axis and the polarized light transmission axis), $d_{eff}$ is the effective thickness of the liquid crystal composition layer having birefringence, $\Delta n$ is the refractive index anisotropy, and $\lambda$ is the wave length of the light. In an actual cell the liquid crystal molecules are fixed at the interface and not all the liquid crystal molecules in the cell are parallel and uniformly oriented in one direction when an electric field is applied. Instead they are significantly deformed particularly near the interface. It is therefore convenient to assume an apparent uniform state as the average of these states. In Equation 1, an effective value is used for the light axis direction of the liquid crystal composition layer.

To obtain a normally closed characteristic in which the display appears dark when a low voltage $V_L$ is applied and bright when a high voltage $V_H$ is applied, the polarizing plates should be arranged so that the light transmission axis (or absorption axis) of one of the polarizing plates is almost parallel to the orientation direction of the liquid crystal molecules (rubbing axis), i.e. $\phi_{P2} \leftrightarrows \phi_{LC1} \leftrightarrows \phi_{LC2}$. The light transmission axis of the other light polarizing plate is perpendicular to the first axis, i.e. $\phi_{P2} = \phi_{P1} + 90°$. When no electric field is applied, since $\chi_{eff}$ in Equation 1 is zero, the light transmission factor $T/T_O$ is also zero. On the other hand, when an electric field is applied, the value of $\chi_{eff}$ increases in dependence on the intensity of the electric field and becomes maximum at 45 degrees. Then, if the light wavelength is assumed to be 0.555 µm, in order to make the light colorless and the light transmission factor maximum, the effective value of $d_{eff} \Delta n$ should be set to half of the wavelength, i.e. 0.28 µm. Actually, however, there is a margin in the value, and values between 0.21 µm and 0.36 µm and suitable, with the values between 0.24 µm and 0.33 µm being preferred.

On the other hand, in order to obtain a normally open characteristics in which the display appears bright when a low voltage $V_L$ is applied and dark when a high voltage $V_H$ is applied, the polarizing plates need be arranged so that $\chi_{eff}$ in Equation 1 is almost 45° when no electric field is applied or an electric field of low intensity is applied. When an electric field is applied, the value $\chi_{eff}$ decreases in dependence on the field intensity as opposed to the case of the normally closed characteristic. However, because there is a residual phase difference of the liquid crystal molecules fixed near the interface even when the $\chi_{eff}$ is minimum (i.e. zero), a significant amount of light will leak under this condition.

In an experiment conducted by the inventors of the present invention, in which the value of d·Δn was set between 0.27 and 0.37 and an effective voltage of 3 to 10 volts was applied, the residual phase difference on the interface was 0.02 to 0.06 μm. Hence, by inserting a phase difference plate having a birefringence phase difference of about 0.02 to 0.06 μm (this phase difference is represented as $R_f$) to compensate for the interface residual phase difference, the dark state becomes darker giving a high contrast ratio. The angle $\phi_R$ of the phase advance axis of the phase difference plate is set parallel to the effective light axis $\chi_{eff}$ of the liquid crystal composition layer when the voltage is applied.

To make the dark state be as black as possible, the angle of the phase advance axis should be aligned precisely with the residual phase difference that occurred when a voltage for displaying a dark state is applied. Therefore, to make the dark state compatible with the increased level of transmission factor and lightness of the bright state, the following relationship must be fulfilled.

$$0.21 \ \mu m < (d \cdot \Delta n - R_f) < 0.36 \ \mu m \qquad \text{Equation 2}$$

Or more preferably, $$0.23 \ \mu m < (d \cdot \Delta n - R_f) < 0.33 \ \mu m \qquad \text{Equation 3}$$

II. Displaying in light spiraling mode: In a conventional twisted nematic (TN) system, when the value of d·Δn is set to around 0.50 μm, a first minimum condition, a high transmission factor and colorless light may be obtained. It has been found preferable to set the value in a range from 0.40 to 0.60 μm. The polarizing plates are arranged such that the transmission axis (or absorbing axis) of one of the polarizing plates is set almost parallel to the orientation direction (rubbing axis) of the liquid crystal molecules on the interface, i.e. $\phi_{LC1} \rightleftharpoons \phi_{LC2}$. For realize a normally closed type device, the transmission axis of the other polarizing plate is set parallel to the orientation direction of the liquid crystal molecules, and for a normally open type, the transmission axis of the polarizing plate is set perpendicular to the orientation direction.

To eliminate light spiraling it is necessary to set the orientation direction of the liquid crystal molecules near the upper and the lower substrate interfaces so that they are almost parallel to each other. If a 90° TN mode is assumed, the liquid crystal molecules on one of the substrates must be turned nearly 90°. However, in displaying in the birefringence mode, the liquid crystal molecules need only be turned about 45°. Furthermore, the birefringence mode has a lower threshold value.

(2) The second advantage is that the visual angle characteristics may be improved In the display mode, the long axes of the liquid crystal molecules are almost parallel to the substrate at all times and do not become perpendicular to the substrate, so that there is only a small change in brightness when the visual angle is changed. This display mode gives a dark state, not by making the birefringence phase difference almost zero by applying voltage as in the case of a conventional display device, but by changing the angle between the long axes of liquid crystal molecules and the axes (absorbing or transmission axis) of the polarizing plate. Thus, the display mode of the present invention differs fundamentally from that of the conventional device.

In a conventional TN type of liquid crystal display deice in which the long axes of the liquid crystal molecules are perpendicular to the substrate interface, the birefringence phase difference of zero is obtained only in a visual direction perpendicular to the front or the substrate interface. Any inclination from this direction results in a birefringence phase difference, which means leakage of light in the case of the normally open type, causing reduction of contrast and reversal of tone levels.

(3) The third advantage is that there is improved freedom in the selection of the materials of the orientation film and/or the liquid crystal, and margin for the related process may thus be increased.

Since the liquid crystal molecules do not become erect, an orientation film for providing a large inclination angle (the angle between the long axis of the liquid crystal molecule and the interface of the substrate), which was used in a conventional device, is no longer necessary. In a conventional liquid crystal display device, when the inclination angle becomes insufficient, two states with different inclination directions and domains bordering the two states occur, giving a possibility to be a poor display. Instead of having such an inclination angle, the display system of the present invention may have the long axis direction of the liquid crystal molecule (rubbing direction) on the substrate interface to be set in a specified direction different from 0° or 90° with respect to the electric field direction For example, when the dielectric constant anisotropy of the liquid crystal is negative, the angle between the electric field direction and the long axis direction of the liquid crystal molecule on the substrate interface $\phi_{LC}$ ($\phi_{LC} > 0$) need exceed 0° normally more than 0.5°, preferably more than 2°. If the angle is to be set exactly 0° degree, two kinds of deformations with different directions, and domains of two different states and their bordering are generated, and a possibility of deterioration in display quality occurs. If the angle is set to more than 0.5°, the apparent long axis direction of the liquid crystal molecule ($\phi_{LC}(V)$) increases uniformly with increasing intensity of electric field, and there is no possibility of the long axis being inclined in the reverse direction, i.e. $\phi_{LC}(V) < 0$.

With this system, since no domains occur even if the angle (inclination angle) between the interface and the liquid crystal molecule is small, it is possible to set the angle to have a small value. The smaller the inclination angle, the greater the process margin for rubbing will be improving, the uniformity of the liquid crystal molecule orientation. Hence, when the present process in which an electric field is supplied in parallel to the interface combines with a low inclination technique, the orientation of the liquid crystal molecule becomes more uniform, and display variations can be reduced much better than in a conventional system even if there are variations of the same magnitude in the manufacturing process.

Generally, there are fewer kinds of orientation films that produce high inclination angle than those giving small inclination angle. The present system increases freedom in the selection of the orientation film material. For example, when an organic polymer is used for the flattening film over the color filters and for the protective film over the thin film transistors and is directly subjected to the surface orientation processing such as rubbing, the organic film can be used with ease as the orientation film simultaneously because there is no need to provide an inclination angle. Hence, it becomes possible to simplify the process and to decrease the cost. In order to eliminate display irregularities due to variations in the manufacturing process, the inclination angle preferably is set below 4° more preferably below 2°.

Furthermore, freedom in the selection of the liquid crystal material can be increased, as will be explained below.

In the present invention, the pixel electrodes and the common electrodes may have a structure in which an electric field generally parallel to the interface of the substrate is applied to the liquid crystal composition layer. The distance between the electrodes can be chosen to be longer than distance between the mutually facing transparent electrodes of the conventional vertical electric field active matrix type liquid crystal display device. The equivalent cross section area of the electrode can be made smaller than that of the conventional arrangement. Hence, the electric resistance between the paired pixel electrodes of the present invention can be significantly larger than that of the mutually facing transparent electrodes of the conventional active matrix liquid crystal display device.

Furthermore, the electrostatic capacitance between the pixel electrode and the common electrode of the present invention can be connected in parallel with capacitive devices, and the capacitive device having a high electric resistance can be achieved. Therefore, the electric charge accumulated in the pixel electrode can be held with ease, and sufficient holding characteristics can be achieved even if the area of the capacitive device is decreased. This area reduces the aperture factor and therefore needs to be small, if possible.

Conventionally the liquid crystal composition has an extremely high specific resistance, for instance $10^{12}$ $\Omega$cm. However, in accordance with the present invention, it is possible to use a liquid crystal composition having a lower specific resistance than the conventional one, without causing any problems. That means not only increased freedom for selection of the liquid crystal material, but also increases of the margin for the processing. In other words, a defect in display quality rarely occurs even if the liquid crystal is contaminated during the processing. Thus, the a margin for the previously described variation at the interface with the orientation film increases, and defects caused at the interfaces are rare. Consequently, processes such as inspection and ageing can be significantly simplified, and the present invention can contribute significantly to a lowering in the cost of thin film transistor type liquid crystal display devices.

Because the present invention permits the pixel electrode to have a more simple shape than the known comb shaped electrode, the efficiency of utilization of the light is increased. It is does not necessary to sacrifice some of the aperture factor, as in conventional methods for obtaining a capacitive device which can accumulate sufficient amount of electric charge. Replacement of the insulator for protecting the thin film transistors with an organic composition enables the dielectric constant to be lower than that when an inorganic composition is used, making it possible to suppress the electric field component generated in the vicinity of the pixel electrode in a vertical direction to the interface of the substrate smaller than the electric field in a lateral direction. This enables the liquid crystal to operate in a wider region. It also contributes to an enhancement of brightness. When the common electrode is used in common as the electrode for the adjacent pixel electrodes, it operates in the same way as the common electrode in the conventional active matrix type liquid crystal display device, but its structure can be simplified as compared with more than conventional arrangements, and the aperture factor can be further increased.

As there is increased freedom in the selection of materials for the liquid crystal, the orientation film, and the insulator, it becomes possible to select insulating materials of the capacitive devices so that the product of their specific resistance and dielectric constant is larger than that of the material of the liquid crystal. Then, one vertical scanning period in the driving signal output from the scanning wiring driving means can be set shorter than the time constant expressed by a product of the specific resistance and the dielectric constant of the insulator of the capacitive devices. Hence, voltage variation at the pixel electrode can be reduced to sufficiently small value.

(4) The fourth advantage is that a simple thin film transistor structure having a high aperture factor can be achieved, permitting enhancement of brightness.

Figure 7:
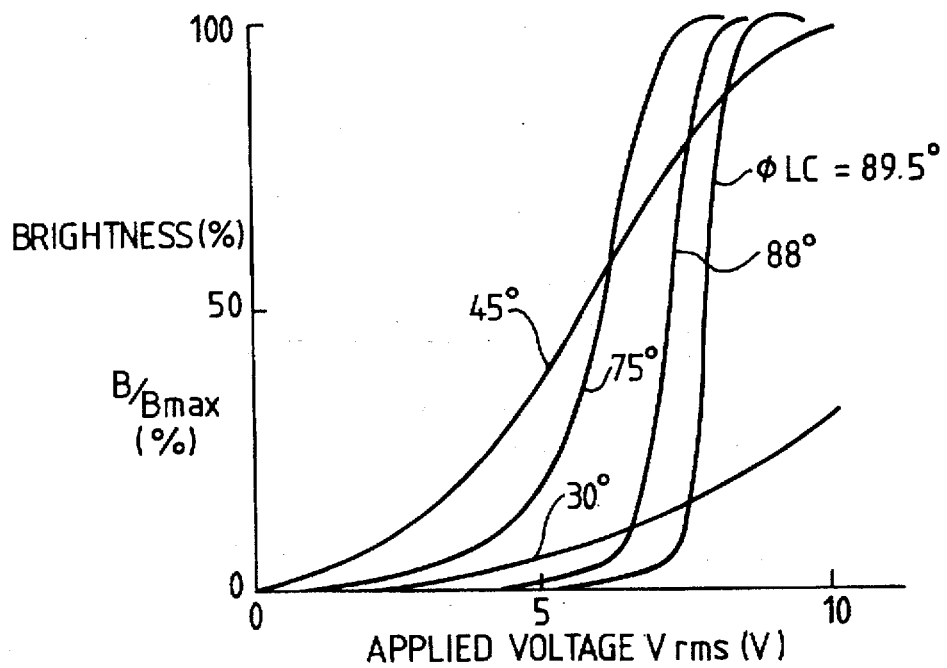
FIG. 7 is a graph illustrating the electro-optical characteristics of various embodiments with different orientation directions of the long axis of the liquid crystal molecules at the interface when the dielectric constant anisotropy is positive

Consider the structure of a pixel including a thin film transistor, when comb shaped electrodes are used as disclosed in (JP-B-63-21907 (1988). There is then the problem that the aperture factor decreases significantly and brightness is lowered. For mass productivity the necessary width of one tooth of the comb shaped electrode is about 8 µm, with a minimum of at least 4 µm. Hence, it is impossible to form a pixel of 0.3×0.1 mm² for a diagonal length 9.4 inches (23.9 cm) color VGA class with a structure having a total of 17 teeth as shown in FIG. 7 of JP-B-63-21907 (1988).

The present invention permits a sufficient aperture factor to be maintained, without losing the described advantages (1) and (2) discussed above. Instead of structures such as comb shaped electrodes which inevitably reduce the aperture factor, the more simple structure of the electrode permits a practical high aperture factor to be achieved.

The first aspect of the invention discussed above relates to structures in which the common electrodes are formed on the mutually facing interfaces of substrates, or the pixel electrodes are formed on a same layer. In (JP-B-63-21907 (1988)), the directions of the signal wiring and the common electrode cross over at the right angles to each other in order to form the comb shaped electrodes. That is, the signal wiring extends in a first direction (Y direction), and the common electrode extends in a direction perpendicular to the first direction (X direction). On the other hand, the present invention permits the avoidance of a complex structure such as comb shaped electrodes by having the signal wiring, the pixel electrode, and the common electrode all extending in a common direction. In order to reduce the threshold voltage of the liquid crystal and to shorten the response time, it is preferable to make the interval between the pixel electrode and the common electrode narrow, locating the pixel electrode and the signal wiring electrode between a pair of common electrodes is also effective and it is not necessary to use a complex structure such as a comb shaped electrode.

The second aspect of the present invention also permits the structure to be simplified and the aperture factor increased by providing the pixel electrode and the common electrode in different layers separated from each other by an insulating layer. This aspect of the present invention differs substantially from JP-B-63-21907 (1988) in that the pixel electrode and the common electrode are provided in separated layers. One advantage of this is that the region for the additional capacitive device which has been reduced by use of the lateral electric field system can be further reduced. Thus, overlapping of the pixel electrode and the common electrode separated by an insulating film becomes possible because they are in separate layers, and a load capacitance can be formed in the region of overlap. The overlapping parts can be used as a part of the wiring for the common electrodes. Hence, it is not necessary to sacrifice a part of the display in order to form a capacitive device. Accordingly, the aperture factor for the pixel can be further increased.

Depending on a design of each pixel, a plurality of capacitive devices can be formed. Hence, the voltage holding characteristics may be significantly improved, and deterioration of the display quality rarely occurs even if severe contamination of the liquid crystal and lowering of off-resistance of the thin film transistor are generated. Furthermore, the insulating film formed between the pixel electrode and the common electrode can be commonly used in common as a gate insulating film of the scanning wiring (gate line) in the same layer. Therefore, there is no need to form a further film, and a process step for providing separate layers is not necessary.

There are other advantages of the separate layers formed by insertion of the insulating film between the pixel electrode and the common electrode for example the probability of short-circuit failures between the pixel and common electrodes can be reduced significantly due to the existence of the insulating film therebetween, and accordingly, the probability of pixel defects can be reduced.

The common electrode and/or the pixel electrode, preferably have shapes making a pattern which makes the aperture factor as large as possible. The pixel electrode or the common electrode has any of a flat shape selected from the group of shapes of a ring, a cross, a letter T, a letter II, a letter I, and a ladder. By suitably combining the selected shapes the aperture factor can be increased significantly, as compared with the case using comb shaped electrodes.

Because the common electrode and the pixel electrode are in separate layers with an insulating film therebetween, it becomes possible to provide electrodes having shapes which overlap each other. Hence, the present invention permits an increase in the aperture factor. When the common electrode is composed of a metallic electrode of which surface is coated with self-oxidized film or self-nitrized film, short-circuit failure between the common electrode and the pixel electrode can be prevented even if the two electrodes mutually overlap, so that the high aperture factor and the prevention of the pixel defects are compatible.

Embodiments of the present invention will now be described in detail.

EMBODIMENT 1

Figure 2A:
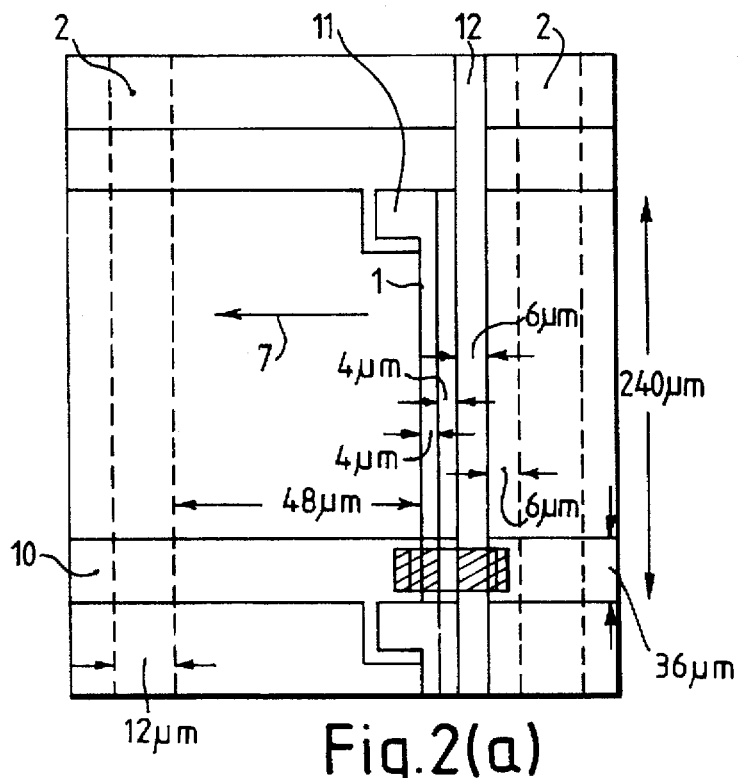
FIGS. 2(a) and 2(b) are planl and sectional views respectively of an embodiment, and show the structure of a thin film transistor which may be used in the present invention.
Figure 2B:
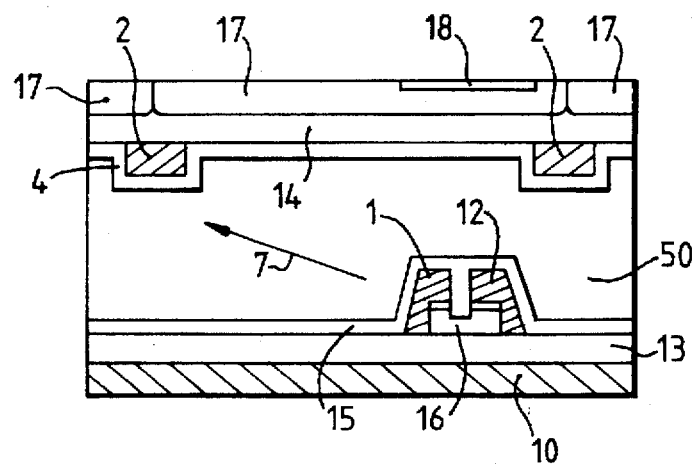

In the first embodiment shown in FIG. 2(a) and 2(b) two glass substrates (not shown in FIG. 2(a) or 2(b) but as shown in FIGS. 1(a) to 1(d)) were used which were polished on the surfaces and 1.1 mm thick. Between these substrates was interposed a nematic liquid crystal which had a positive dielectric constant anisotropy $\Delta\epsilon$ of 4.5 and birefringence $\Delta n$ of 0.072 (589 nm, 20 C°). A polyimide orientation control film applied over the substrate surface was subjected to rubbing processing to produce a pretilt angle of 3.5 degrees. The rubbing directions of the upper and the lower interfaces were almost parallel and at an angle of 85 degrees ($\phi_{LC1}=\phi_{LC2}=85°$) with respect to the direction of the applied electric field.

A gap d was formed by dispersing spherical polymer beads between the substrates so that the gap became 4.5 μm when the liquid crystal was sealed. Hence, $\Delta n \cdot d$ was 0.324 μm. The resulting structure was clamped by two polarizing plates (not shown) (manufactured by e.g. Nitto Denko, with reference G1220DU). One of the polarizing plates had its polarized light transmission axis set in almost parallel to the rubbing direction, i.e. $\phi_{P1}=85°$. The polarized light transmission axis of the other polarizing plate was set perpendicular to the former, i.e. $\phi_{P2}=-5°$. As a result, a normally closed characteristics was obtained.

The structure of the thin film transistor and various electrodes for one pixel element are as shown in FIG. 2 (a) and FIG. 2 (b), such that the thin film transistor device (hatched portion in FIG. 2(a) has a pixel electrode (source electrode) 1, a signal electrode (drain electrode) 12, and a scanning electrode (gate electrode) 10. The pixel electrode 1 extends in a first direction (the vertical direction in FIG. 2), the signal electrode 12 and the common electrodes 2 extend in the first direction, and extend so as to cross over a plurality of pixels (the pixels being arranged vertically in FIG. 2), and the thin film transistor device is located between the common electrodes 2.

Signal waves having information are supplied to the signal electrode 12, and scanning waves are supplied to the scanning electrode 10 synchronously. A channel layer 16 composed of amorphous silicon (a-Si) and the thin film transistor composed from an insulating protective film 15 of silicon nitride (SIN) are arranged between adjacent common electrodes. Information signals are transmitted from the signal electrode 12 to the pixel electrode 1 through the thin film transistor, and a voltage is generated between the common electrode 2 and the liquid crystal 50.

In the present embodiment, the common electrodes are arranged at the facing interface side of the substrate and is enlarged in the thickness direction in the illustration in FIG. 2 (b). Therefore, although the electric field direction 7 shown in FIG. appears to be inclined relative to the horizontal, the thickness of the liquid crystal layer 5 is actually about 6 μm as compared with the width of 48 μm, so that the inclination is very small and the supplied electric field direction is almost parallel to the interface of the substrate.

A capacitive device 4 was formed in a structure in which the protruded pixel electrode 1 and the scanning wiring 10 held a gate insulating film therebetween as shown in FIG. 1 (c). The electrostatic capacitance of the capacitive device 11 was about 21 fF. Each of the lines of the scanning wiring 10 and the signal wiring 11 were connected to a scanning wiring driving LSI and a signal wiring driving LSI respectively.

Electric charge accumulates in the pixel electrode 1 to about 24 fF, which is a capacitance of parallel connection of the electrostatic capacitance between the pixel electrode 1 and the common electrode 2 and that of the capacitive device 11. Therefore, even if the specific resistance of the liquid crystal 50 is $5\times10^{10}$ Ωcm, the voltage variation at the pixel electrode 1 could be suppressed, and deterioration of the display quality was prevented.

In this embodiment the number of the pixels were 40(× 3)×30, and pixel pitch was 80 μm in a lateral direction (i.e. between the common electrodes) and 240 μm in a vertical direction (i.e. between the scanning electrodes). A high aperture factor of e.g. 50% was obtained, with the scanning electrode 10 being of 12 μm wide and the interval between the adjacent scanning electrodes being 68 μm. Three stripe shaped color filters 17 being respective red (R), green (G) and blue (B) were provided on the substrate facing the substrate supporting the thin film transistors. On the color filter.

A transparent resin 14 was laminated on the color filters 17 for surface flattening. The material of the transparent resin 14 was preferably, epoxy resin. An orientation control film 4, e.g. of polyimide group, was applied to the transparent resin. A driving circuit was connected to the panel.

Figure 8:
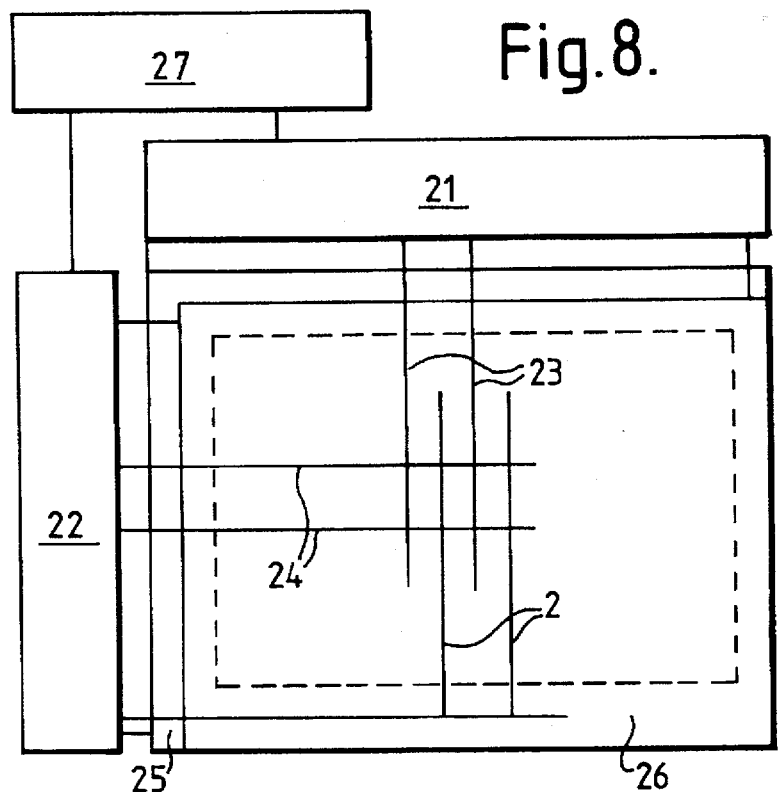
FIG. 8 illustrates schematically a liquid crystal display driving circuit system which may be used in the present invention.
Figure 9:
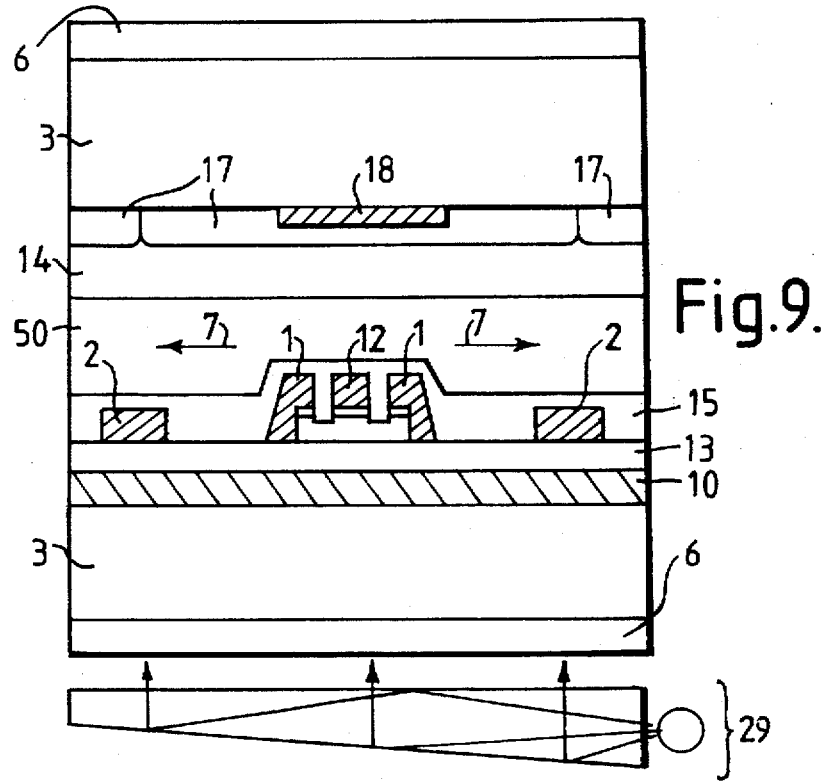
FIG. 9 illustrates an example of the present invention applied to a liquid crystal display transmission type optical system.
Figure 10:
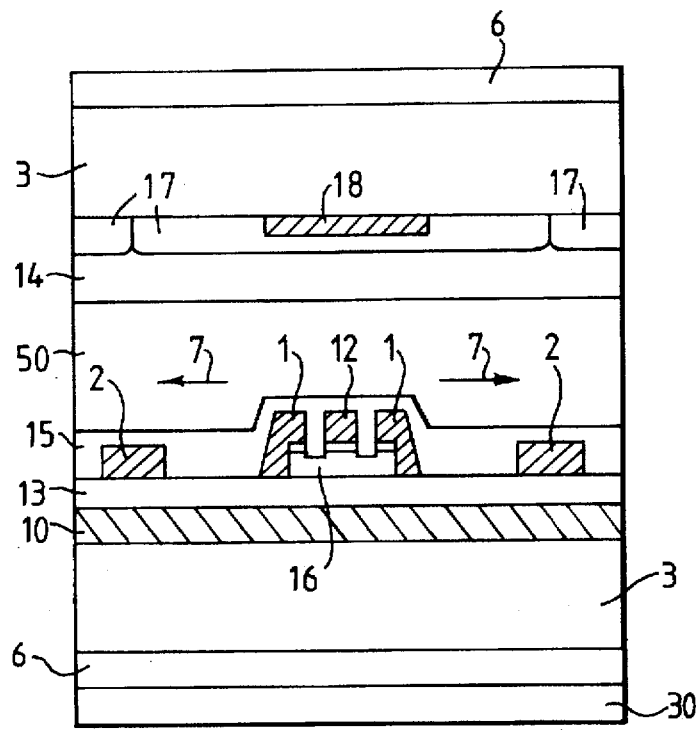
FIG. 10 illustrates an example of the present invention applied to a liquid crystal display reflection type optical system.

The structure of the driving circuit system in the present embodiment is shown in FIG. 8. A signal electrode 23 and a common electrode 31 extend to the end of the display portion. FIGS. 9 and 10 show the structure of the optical systems needed, FIG. 9 for being for a transmission type device and FIG. 10 being for a reflection type device with a reflector 30.

As the present embodiment does not need any transparent electrodes, the manufacturing process becomes simple, the production yield increases, and the manufacturing cost can be significantly reduced In particular, there is no need for extremely expensive facilities having vacuum furnaces for forming the transparent electrodes and there may thus be a significant reduction in investment in the manufacturing facilities, permitting and or accompanying cost reduction.

Figure 3A:
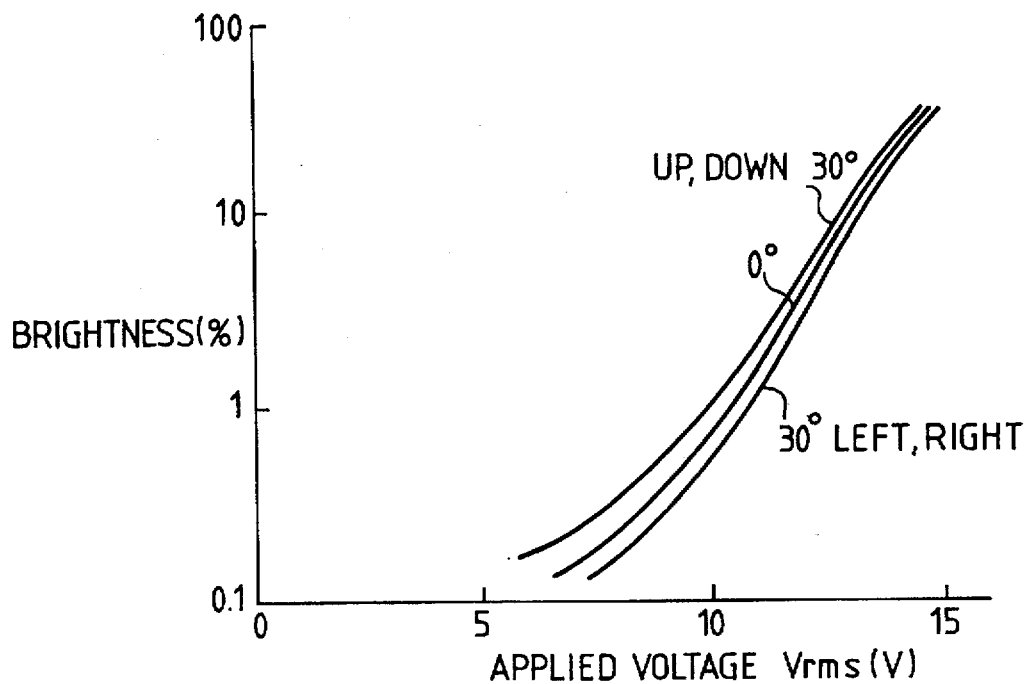
FIGS. 3(a) and 3(b) are graphs illustrating elector-optical characteristics (visual angle dependance), FIG. 3(a) corresponding to the present invention and FIG. 3(b) corresponding to a comparative example.

The electro-optical characteristics showing the relationship between the effective voltage applied to the pixels and the brightness in the present embodiment is shown in FIG. 3(a). The contrast ratios exceeded 150 when driven by voltages of e.g. 7 V. The difference between the characterising when the visual angle was changed laterally or vertically were significantly smaller than in conventional system (to be discussed in comparative example 1), and the display characteristics was not changed significantly even if the visual angle was changed. Orientation character of the liquid crystal was preferable, and domains of orientation defects are not generated. The aperture factor maintained a sufficiently high value, e.g. 50% by simplifying the structure of the thin film transistor and the electrodes, and a bright display was achieved. The average transmission factor for the whole panel was 8.4%. It should, be noted that the term brightness is defined as the brightness of transmission when the two polarizing plates are arranged in parallel.

The material of the liquid crystal 50 used in the first embodiment had a dielectric constant of 6.7 and a specific resistance of $5 \times 10^{10}$ $\Omega$cm, and silicon nitride was used for the insulator of the capacitive device 11 had a dielectric constant of 6.7 and a specific resistance of $5 \times 10^{16}$ $\Omega$cm. That means that the specific resistances of both the liquid crystal composition and the insulator of the capacitive device 11 were over $10^{10}$ $\Omega$cm, and the product of the dielectric constant and the specific resistance of the silicon nitride, about $3 \times 10^4$ seconds, was larger than the product of the dielectric constant and the specific resistance of the liquid crystal composition about 0.03 seconds. One vertical scanning period for the driving signal output from the scanning wiring driving LSI was about 16.6 ms with an ordinary liquid display device, and the value satisfied the condition that the scanning period should be far less than about $3 \times 10^4$ seconds. Therefore, it was possible to derive the time constant for accumulated charge leaking from the pixel electrode 1. This facilitates the suppression of voltage variations at the pixel electrode 1, and consequently a satisfactory display quality can be obtained. The value of $5 \times 10^{10}$ $\Omega$cm for the specific resistance of the liquid crystal is lower than that for the liquid crystal used for the conventional vertical electric field thin film transistor liquid display device, which is about $10^{12}$ $\Omega$cm. However, defects in the display quality were not generated.

COMPARISON EXAMPLES

The comparison example referred to above was based on a conventional twisted nematic (TN) type of liquid crystal display device. Since this example had a transparent electrode, the structure was complex and the manufacturing process was long compared with the first embodiment. The nematic liquid crystal used in the comparison example had a dielectric constant anisotropy $\Delta\epsilon$ of positive 4.5 and a birefringence $\Delta n$ of 0.072 (589 nm, 20° C.), the same as those of the Embodiment. The gap was set to 7.3 μm and the twist angle to 90 degrees. Thus, $\Delta n \cdot d$ is 0.526 μm.

Figure 3B:
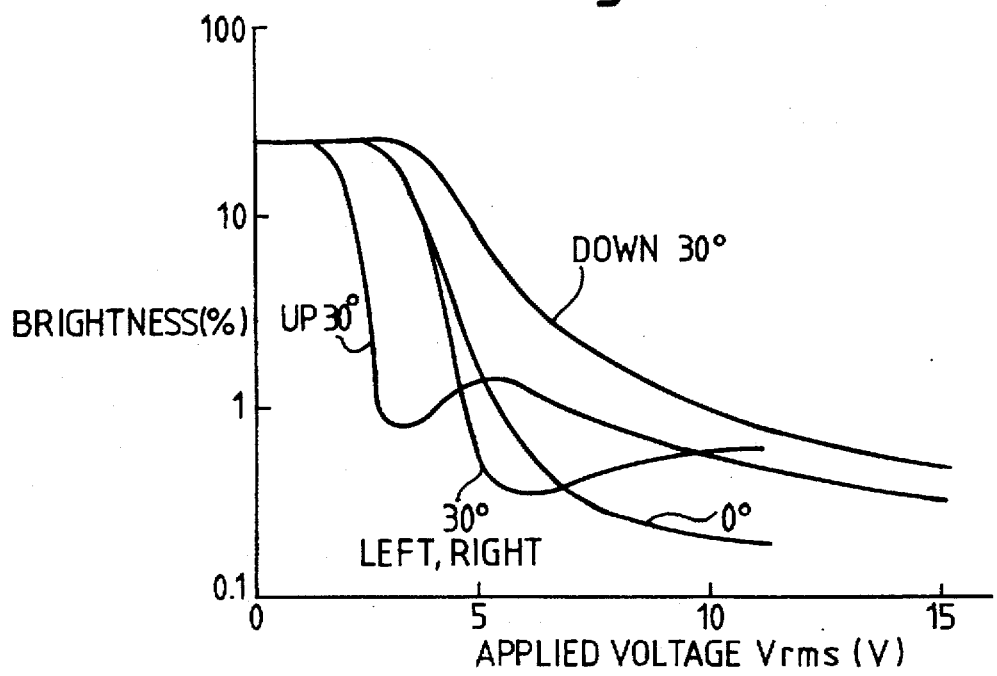

The electro-optical characteristic of this comparison example is shown in FIG. 3(b). The characteristic curves change greatly as the visual angle changes. Near a stepped portion adjacent to the thin-film transistor, an orientation failure domain occurs where the liquid crystal molecules are oriented in a direction different from that of the surrounding portion.

EMBODIMENT 2

Figure 4:
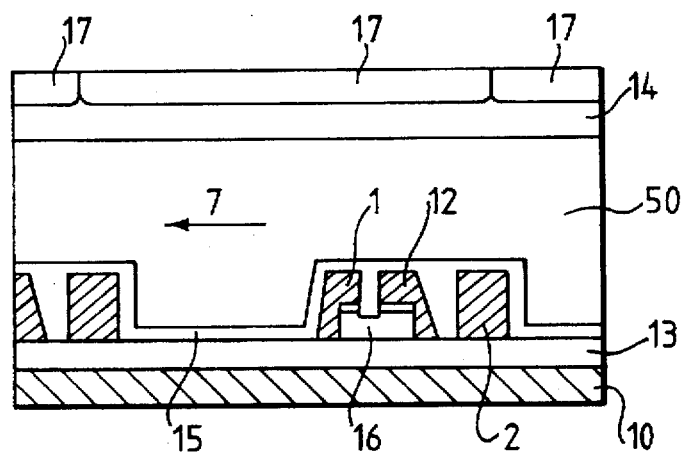
FIG. 4 shows an embodiment of the present invention in which the pixel electrode (source electrode), the common electrode, the scanning electrode, and the signal electrode (drain electrode) are all arranged on only one of the substrates of the device.

In the second embodiment, the scanning electrode which had been arranged on the substrate facing the substrate supporting the pixel in the first embodiment was formed on the same substrate as the pixel electrode. The rest of the structure of the second embodiment is generally the same as that of the first embodiment and corresponding parts are indicated by the same reference numerals. The cross section of the structure of the thin film transistor and the electrodes in the second embodiment are shown in FIG. 4. The pixel electrode 1, the signal electrode 12, and the scanning electrode 10 were all made from aluminum, and were formed simultaneously by deposited and etched. There is no conductive material on the other substrate. Hence, in this structure, even if the conductive material is contaminated during the manufacturing process, there is no possibility of upper and lower electrodes touching each ether, and defects due to the upper and lower electrodes touching is eliminated. There is no special restriction on the material for the electrodes, but it should normally be a metal having low electric resistance, and chromium, copper, etc are thus suitable.

Generally, the precision of alignment of photomasks is significantly higher than that for two facing glass substrates. Therefore, variations in the alignment of the electrodes can be suppressed when all of the four electrodes are formed on only one of the substrates, as in the second embodiment because alignment of the electrodes during manufacturing can be only photomasks. Therefore, the present embodiment is suitable for forming more precise patterns in comparison with the case when the scanning electrode is formed on the other substrate.

A bright display having the same wide visual angle as the first embodiment was obtained.

EMBODIMENT 3

The structure of the third embodiment is generally the same as the first embodiment 1 except as will be described below. Components which correspond to components of the first embodiment are indicated by the same reference numerals.

Figure 5A:
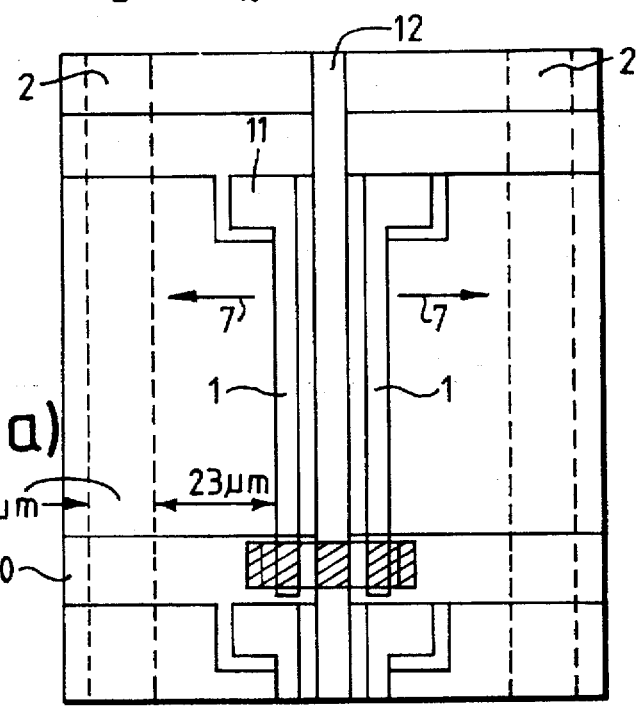
FIGS. 5(a) and 5(b) are plan and sectional views of an embodiment of the present invention in which the pixel electrode (source electrode) and the signal electrode (drain electrode) are arranged at the center of the pixel to divide the pixel into two parts.
Figure 5B:
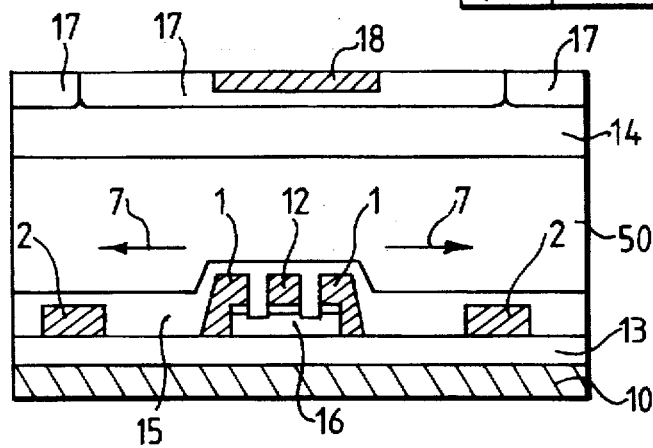

The structure of the thin film transistor and the various electrodes of the third embodiment is shown in FIGS. 5(a) and 5(b). The signal electrode 12 was arranged between a pair of pixel electrodes 1 and a pair of common electrodes 2 were arranged outside the above electrodes. A signal wave having information is applied to the signal electrode 12, and a scanning wave is applied to the scanning electrode 10 synchronously with the signal wave. A thin film transistor comprising amorphous silicon (a-Si) 16 and an insulating-protecting film 15 of silicon nitride (SiN) is arranged substantially centrally between a pair of common electrodes. The same information signals are transmitted from the signal electrode 12 to each of two pixel electrodes 1 through two thin film transistors, and the same voltage signals are applied to the liquid crystal, and each of two common electrodes at both sides have the same potential. With this arrangement, the a distance between the electrodes can be decreased by almost a half without making the structure of the thin film transistor and the electrodes complex. It thus becomes possible to apply a high electric field with the same voltage, and decrease the driving voltage. Hence, a high response can be achieved.

This embodiment permits the same brightness and wipe visual angle to be achieved as in the first embodiment.

EMBODIMENT 4

The structure of the fourth embodiment is generally the same as the first embodiment except as will be described below. Components of the fourth embodiment which correspond to the first embodiment are indicated by the same reference numerals.

FIG. 15(a) is a partial plan view of an active matrix type liquid crystal display device being the fourth embodiment. FIG. 15(b) is a cross sectional view taken on line A—A' in FIG. 15 (a), and FIG. 15 (c) is a cross sectional view taken on line B—B' in FIG. 15 (a). The capacitive device 11 which had a structure in which the gate insulating film composed from silicon nitride 13 was located between the pixel electrode 1 and the scanning wiring 10 in the first embodiment 1 was changed to a structure in which the liquid crystal composition layer 50 extended between parts of the pixel electrode 1 and the common electrode 2 which faced each other, as shown in FIG. 15 (c).

The fourth embodiment enables an electrostatic capacitance of the capacitive device 11 to be connected in parallel to an electrostatic capacitance between the pixel electrode 1 and the common electrode 2. Hence, any voltage variation at the signal wiring 10 does not affect the pixel electrode 1. Therefore, the voltage variation at the pixel electrode 1 could be reduced, reducing variations in the display.

There was no deterioration in display quality with the active matrix type liquid crystal display device of this fourth the present embodiment, and the same advantages as the first embodiment were obtained.

EMBODIMENT 5

The structure of each of the fifth to tenth embodiments are genereally the same as the first embodiment, except as will be described below. Corresponding parts are indicated by the same reference numerals.

Figure 16:
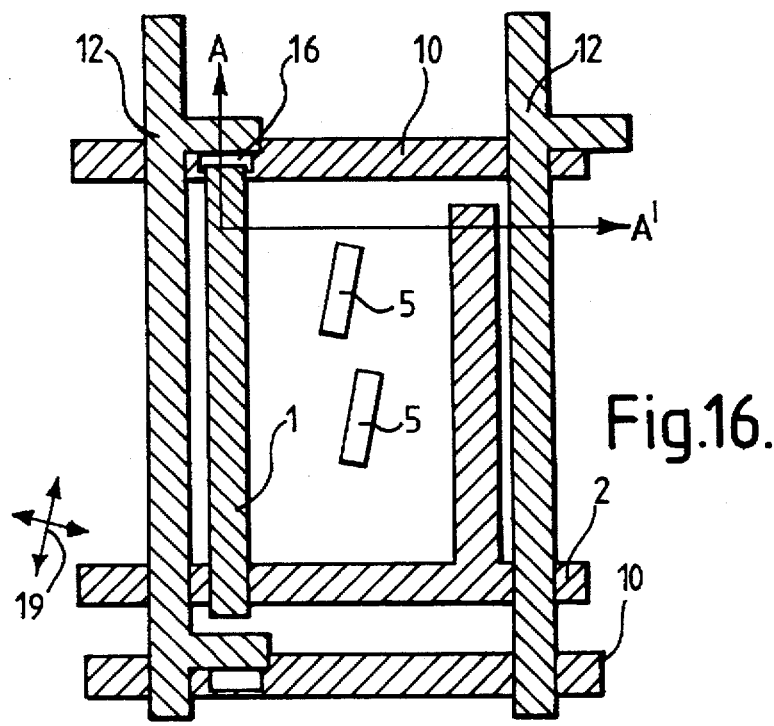
FIG. 16 is a schematic plan view of a pixel when no electric field is applied, for a fifth embodiment of the present invention in which the pixel electrode and the common electrode are arranged at different layers separated by an insulating layer.
Figure 17:
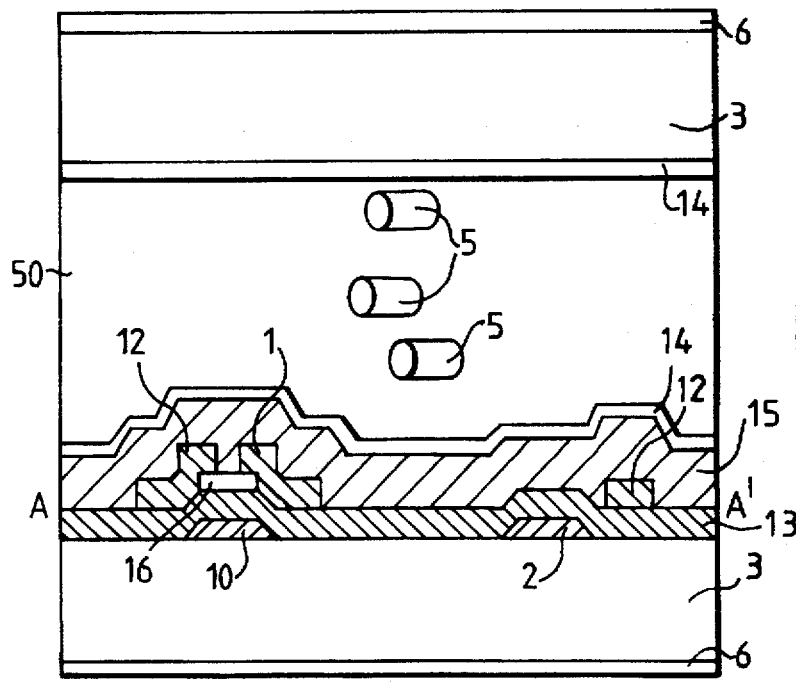
FIG. 17 is a schematic cross sectional view of a pixel when no electric field is applied in the fifth embodiment in which the pixel electrode and the common electrode are arranged at different layers separated by an insulating layer.

FIGS. 16 and 17 respectively show a plan view and a cross sectional view of an unit pixel of the fifth embodiment, in which the pixel electrode 1 and the common electrode 2, are located on the same side of the liquid crystal materia and are separated by an insulating layer. A scanning electrode 10 and a common electrode 2 of chromium were formed on a glass substrate, and a Gate insulating film 13 of silicon nitride (SIN) was formed so as to cover the above electrodes. An amorphous film (a-Si) 16 was formed on a part of the scanning electrode 10 with the gate insulating film 13 therebetween as an active layer of the transistor.

A signal electrode 12 and a pixel electrode 1 of molybdenum were formed to overlap on a part of the pattern of the a-Si film 16, and a protection and insulating film 15 of SiN film was formed so as to cover the resulting structure. When the thin film transistor was operated by applying a voltage to the scanning electrode 13 of the thin film transistor, a voltage is applied to the pixel electrode 1. When an electric field is induced between the pixel electrode 1 and the common electrode 2 the liquid crystal molecules change their orientation in the direction of the electric field and the light transmission changes.

In the fifth embodiment, the common electrode 2 was formed on the same layer as the scanning electrode 10, and the pixel electrode 1 and the signal electrode 12 were separated from the common electrode 2 by the gate insulating film 13. The device of the fifth embodiment thus differs from that of JP-B-63-21907 (1988), in that conventional comb shaped electrodes are not used, and the pixel electrode 1 and the common electrode 2 overlap with the gate insulating film 20 therebetween. By separating the pixel electrode 1 and the signal electrode 12 from the common electrode 2 by insulation, design freedom for the plan pattern of the pixel electrodes 1 and the common electrodes 2 is increased, and it becomes possible to increase the pixel aperture factor The overlapping parts of the pixel electrode 1 and the common electrode 2 operate as an additional capacitance which is connected in parallel to the liquid crystal capacitance, and accordingly, it becomes possible to increase the holding ability of the liquid crystal charged voltage. This advantage cannot be achieved by conventional comb shaped electrode, and the advantages are achieved only by separating the pixel electrode 1 and the signal electrode 12 from the common electrode by insulation manner. As FIG. 16 reveals, it is not necessary to form a capacitive device by sacrificing a part of the display region, as in the case when the pixel electrode and the common electrode are formed on the same substrate, and all that is needed is to make an overlap in a part of the wiring for leading out the common electrode outside the display region.

As described above, since the design freedom for the plan pattern increases by forming the pixel electrode 1 and the signal electrode 12 in a separate layer from the layer having the common electrode 2, various types and shapes for the electrodes can be adopted notwithstanding the present embodiment.

EMBODIMENT 6

Figure 18:
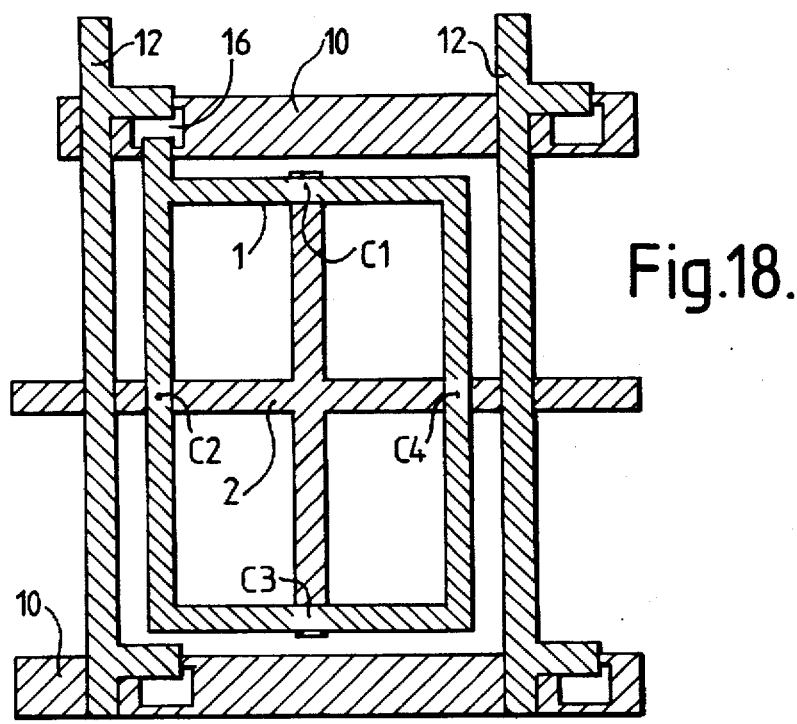
FIG. 18 is a schematic plan view of a pixel when no electric field is applied in a sixth embodiment of the present invention in which the pixel electrode and the common electrode are arranged at different layers separated by an insulating layer, the pixel electrode is a closed loop and the common electrode is cruciform.

FIG. 18 shows an plan view of a unit pixel in the sixth embodiment of the present invention in which the pixel electrode 1 and the common electrode 2 are located in different layers separated by an insulating layer. The cross sectional structure of the sixth embodiment is the same as that of the fifth embodiment (FIG. 17).

In the sixth embodiment, the common electrode 2 is cruciform and the pixel electrode 1 is forms a closed loop. The pixel electrode 1 and the common electrode 2 overlap at parts C1, C2, C3 and C4 in FIG. 18, so as to form additional capacitances. In the sixth embodiment, the distance between the common electrode 2 and the scanning electrode 10 can be made wide, and thus failures due to short circuits between the common electrode 2 and the scanning electrode 10 can be prevented. Since the pixel electrode 1 is in the form of a closed loop, normal operation can be maintained as power is supplied to all parts of the pixel electrode even if a breaking occurs at an arbitrary portion of the pixel electrode, unless a break occurs at two or more parts. That means, that the structure of the sixth embodiment has a redundancy for breaking of the pixel electrode 1 and the production yield can therefore be increased. On account of the redundancy, it becomes possible to reduce the wiring gap of the closed loop electrode 1, to make that electrode 1 close to the wiring part of the scanning electrode 10 when they are arranged in different layers, so increasing the aperture factor.

EMBODIMENT 7

Figure 19:
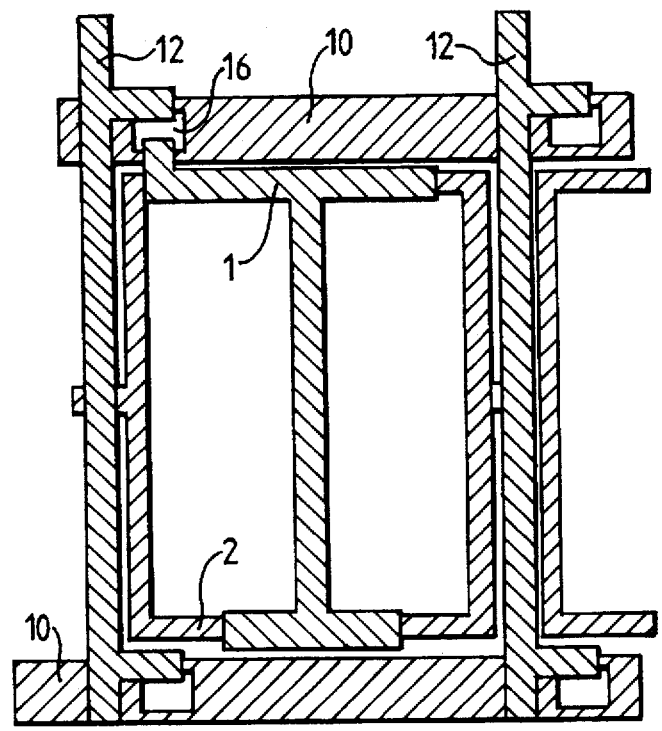
FIG. 19 is a schematic plan view of a pixel when no electric field is applied in a seventh embodiment of the present invention in which the pixel electrode and the common electrode are arranged at different layers separated by an insulating layer, the pixel electrode has the shape of the letter I, and the common electrode is a closed loop.

FIG. 19 shows a plan view of a unit pixel in a seventh embodiment of the present invention in which the pixel electrode 1 and the common electrode 2 are located in different layers separated by an insulating layer. The cross sectional structure of the seventh embodiment is the same as that of the fifth embodiment (FIG. 17).

In the sixth embodiment, the pixel electrode 1 is in the shape of a letter I, and the common electrode 2 is in the form of a closed loop. In the seventh embodiment, the aperture factor can be improved as in the sixth embodiment, and the additional capacitance can be increased because the overlapping of the pixel electrode 1 and the common electrode 2 can be increased.

EMBODIMENT 8

Figure 20:
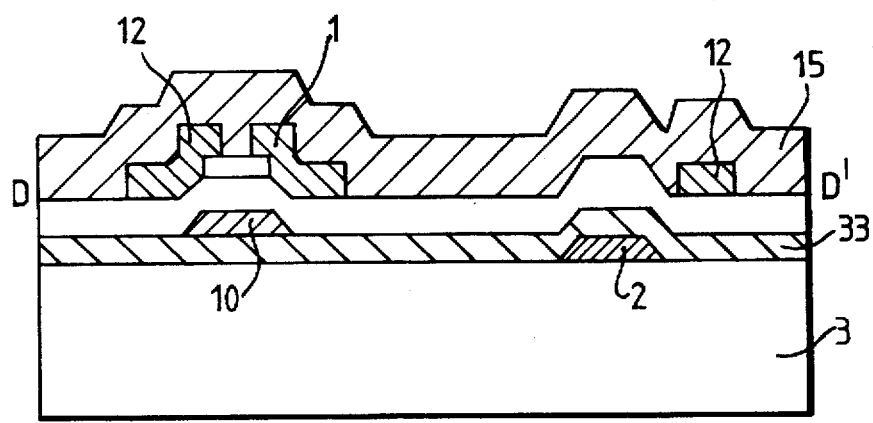
FIG. 20 is a schematic cross sectional view of part of a pixel when no electric field is applied in an eighth embodiment of the present invention in which the pixel electrode and the common electrode are arranged at different layers separated by an insulating layer, and there is an insulating layer between the scanning electrode and the common electrode.

FIG. 20 shows a plan view of a unit pixel in an eighth embodiment of the present invention in which the pixel electrode 1 and the common electrode 2 are located in different layers separated by an insulating layer.

In the eighth embodiment, the common electrode 2 is mounted on the substrate 3 and separated from the scanning electrode 10 by a bedding layer insulating film 23. Thus, the common electrode 2 is located on the substrate 3, and is in a different layer separate from the layers forming the scanning electrode 10, the pixel electrode 1, and the signal electrode 12. Therefore, in accordance with the eighth embodiment, it becomes possible for the common electrode 2 to extend not only parallel to the scanning electrode 10 but also a perpendicular to the scanning electrode 10 to form a network structure. Therefore, the resistance of the common electrode 2 can be decreased, and accordingly, reductions of the wave distortion in the common voltage and prevention of smear generation can be achieved.

EMBODIMENT 9

Figure 21:
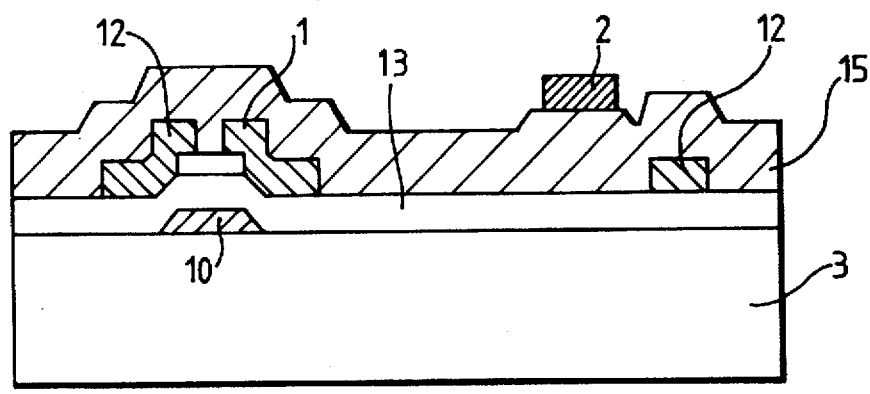
FIG. 21 is a schematic cross sectional view of part of a pixel when no electric field is applied in a ninth embodiment of the present invention in which the pixel electrode and the common electrode are arranged at different layers separated by an insulating layer, and the common electrode is formed on the protection insulating film.

FIG. 21 shows a plan view of unit pixel in a ninth embodiment of the present invention in which the pixel electrode 1 and the common electrode 2 are located in different layers separated by an insulating layer.

In the ninth embodiment, the common electrode 2 is mounted on a protecting-insulating film 15. In accordance with the present embodiment, the common electrode 2 is located in a different layer separate from the layers forming all the scanning electrode 10, the pixel electrode 1, and the signal electrode 12, as the eighth embodiment. Therefore, it is possible for the common electrode 2 to extend not only parallel to the scanning electrode 10 but also perpendicular direction to the scanning electrode 10 to form a network structure. Accordingly, the resistance of the common electrode 2 can be reduced, wave distortion in the common voltage can be decreased, and smear generation can be prevented.

EMBODIMENT 10

Figure 22:
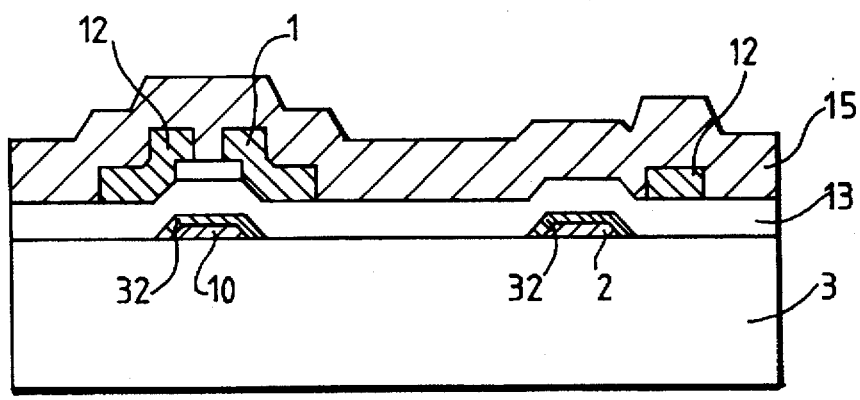
FIG. 22 is a schematic cross sectional view of part of a pixel when no electric field is applied in a tenth embodiment of the present invention in which the pixel electrode and the common electrode are arranged at different layers separated by an insulating layer, and both the scanning electrode and the common electrode are made from aluminum coated with self-oxidized film.

FIG. 22 shows a plan view of a unit pixel in a tenth embodiment of the present invention in which the pixel electrode 1 and the common electrode 2 are located in different layers separated by an insulating layer.

In the tenth embodiment, the scanning electrode 10 and the common electrode 2 are made from aluminum (A1), and surfaces of those electrodes 2,10 are covered by alumina ($AL_2O_3$) 32 which is a self-oxidized film of aluminum. The adoption of such a structure having double insulating layers decrease, failure of the insulation between the common electrode 2, the signal electrode 12, and the pixel electrode 1, and accordingly, pixel failure can be decreased.

EMBODIMENT 11

The structure of the eleventh embodiment is generally the same as the first embodiment except as will be described below. Corresponding parts are indicated by the same reference numerals.

In the eleventh embodiment a flattening film 14 (FIG. 2(b)) made from a transparent polymer was laminated on the color filters 27 as an organic insulating layer, and the surface of the film was subjected to a direct rubbing treatment without forming other films such as an orientation control film on the flattening film 14. Epoxy resin was used for the material of the transparent film. The epoxy resin has two functions namely of flattening and orientation control of the liquid crystal molecules. The liquid crystal composition layer contacted directly with the epoxy resin, and the inclination angle of the interface was 0.5 degrees.

This structure eliminates the need to provide orientation film, and makes the manufacturing easier and shorter.

Generally, in the conventional twisted nematic (TN) type, a variety of characteristics are required for the orientation film, and it was necessary to satisfy all of those above requirements. Therefore, the material for the orientation film was limited to a small variety of materials such as polyimide etc. The inclination angle is the most important characteristic. However, as explained previously, the present invention does not require a large inclination angle and thus the range of material selection is significantly increased.

Measurement of electro-optical characteristics of the eleventh embodiment revealed that, as in-the first embodiment, the change in the characteristic curves was extremely small when the visual angle was changed laterally and vertically, and the display characteristics hardly changed. Although the inclination angle was as small as 0.5 degrees, the liquid crystal orientation was satisfactory, and no orientation failure domain was generated.

EMBODIMENT 12

In the twelfth embodiment, the transparent resin forming the flattening film 14 in the eleventh embodiment was changed from epoxy resin to polyimide resin. The surface of the polyimide resin was directly rubbed so that it had both the function of flattening and the function of orientation control of the liquid crystal molecules. The inclination angle on the interface was 2 degrees. In comparison with other embodiments, the display characteristics hardly changed. The liquid crystal orientation was satisfactory and no orientation failure domain was generated.

EMBODIMENT 13

The structure of the thirteenth embodiment was the same as the first embodiment 1 except as will be described below. Corresponding parts are indicated by the same numerals.

The protection film 15 (FIG. 2(b)) of silicon nitride for protecting the thin film transistor was in the first embodiment replaced with an organic insulating layer made from epoxy resin. The surface of the epoxy resin was directly treated by rubbing so that it functions both as a flattening film and an orientation control film for the liquid crystal molecules. The inclination angle was 0.5 degrees.

Measurement of the electro-optical characteristics of the thirteenth embodiment revealed that the display characteristics were hardly changed in comparison with the first embodiment 1. Although the inclination angle was as small as 0.5 degrees, iin the eleventh embodiment, the liquid crystal orientation was satisfactory, and no orientation failure domain was generated.

EMBODIMENT 14

In the fourteenth embodiment, the epoxy resin used as the protection film in the thirteenth embodiment was replaced with an organic insulating layer made from polyimide resin.

Measurement of the electro-optical characteristics in the fourteenth embodiment revealed that the display characteristics were hardly changed in comparison with the first embodiment 1. The inclination slightly increased angle to 2.0 degrees in comparison with the thirteenth embodiment. The liquid crystal orientation was satisfactory, and no orientation failure domain was generated.

EMBODIMENTS 15-19

The structure of the fifteenth to nineteenth embodiments were the same as the fourteenth embodiment except as will be described below.

In the fifteenth embodiment, the directions of the long axes of the liquid crystal molecules on the upper and the lower interfaces (the rubbing direction) were almost in parallel to each other and set at 89.5 degrees ($\phi_{LC1}=\phi_{LC2}=$ 89.5°) with respect to the applied electric field. The polarized light transmission axis of one of the polarizing plates was set almost in parallel to the rubbing direction ($\phi_{P1}=$ 89.5°) and the polarized light transmission axis of the other polarizing plate was set perpendicular to the first axis ($\phi_{P2}=-0.5°$).

Similarly, in the sixteenth embodiment, $\phi_{LC1}=\phi_{LC2}=\phi_{P1}=$ 88°, and $\phi_{P2}=-2.0°$.

Similarly, in the seventeenth embodiment, $\phi_{LC1}=\phi_{LC2}=\phi_{P1}=75°$, and $\phi_{P2}=-25°$.

Similarly, in the eighteenth embodiment, $\phi_{LC1}=\phi_{LC2}=\phi_{P1}=450°$, and $\phi_{P2}=-45°$.

Similarly, in the ninteenth embodiment, $\phi_{LC1}=\phi_{LC2}=\phi_{P1}=30°$, and $\phi_{P2}=-60°$.

The results of the measurement of the electro-optical characteristics for these embodiments are shown in a single diagram of FIG. 7. In these embodiments, the brightness was expressed by a normalized value such that the maximum brightness in a range of applied voltage from zero volt to 10 volts (effective value $V_{rms}$) was 100% and the minimum brightness was 0%. There was a tendency for the characteristics curves of threshold to become steep as the angle $\phi_{LC}$ was increased. In order to provide a large voltage margin for half-tone, the angle $\phi_{LC}$ must be reduced. However, there was a tendency that when the $\phi_{LC}$ was smaller than 45 degrees, brightness decreased. The optimum value of the angle $\phi_{LC}$ depends on the number of the half-tone levels to be displayed, the requirement for brightness, driving voltage, and whether or not the common electrode has a voltage applied thereto. A designer can control the threshold characteristics in a wide range by suitably selecting the angle $\phi_{LC}$. When considering brightness, the angle is preferably $\phi_{LC}$ at least 45 degrees. An angle between 60 degrees and 89.5 degrees is more preferable.

Measurement of the visual angle characteristics revealed that, in each case, the characteristics curve changed very slightly when the visual angle was changed laterally and vertically, and the display characteristics were hardly changed, as in the first embodiment 1.

The liquid crystal orientation was satisfactory, and no orientation failure domain was generated.

EMBODIMENTS 20-23

The greatest difference between the foregoing embodiments previously described and the twentieth to twenty-third embodiments was that the dielectric constant anisotropy of the liquid crystal composition layer was set to be negative and the rubbing direction was changed accordingly. A nematic liquid crystal (e.g. that known as ZLI-2806 of Merck Co.) with Δε of −4.8, and Δn of 0.0437 (589 nm, 20 C.°) was used. In the twentieth to twenty-third embodiments, the directions of the long axes of liquid crystal molecules on the upper and the lower interfaces (the rubbing directions, ($\phi_{LC1}\phi_{LC2}$) were approximately parallel ($\phi_{LC1}=\phi_{LC2}$) to each other and set at an angle, $\phi_{LC1}$, exceeding zero degree and less than 45 degrees with respect to the applied electric field. The polarized light transmission axis of one of the polarizing plates was set approximately parallel to the rubbing direction ($\phi_{P1}$) and the polarized light transmission axis of the other polarizing plate was set perpendicular to the first axis ($\phi_{P2}$).

Thus, in the twentieth embodiment, $\phi_{LC1}=\phi_{LC2}=\phi_{P1}=1.5°$, and $\phi_{P2}=-88.5°$.

In the twenty-first embodiment, $\phi_{LC1}=\phi_{LC2}=\phi_{P1}=15°$, and $\phi_{P2}=-75°$.

In the twenty-second embodiment, $\phi_{LC1}=\phi_{LC2}=\phi_{P1}=30°$, and $\phi_{P2}=-60°$.

In the twenty-third embodiment, $\phi_{LC1}=\phi_{LC2}=\phi_{P1}=45°$, and $\phi_{P2}=-45°$.

The gap d was set to be 6.3 μm with the liquid crystal under sealed conditions and the Δn·d was set to be 0.275 μm. Other conditions such as the structure of the thin film transistor, and the electrodes were the same as the third embodiment.

Figure 11:
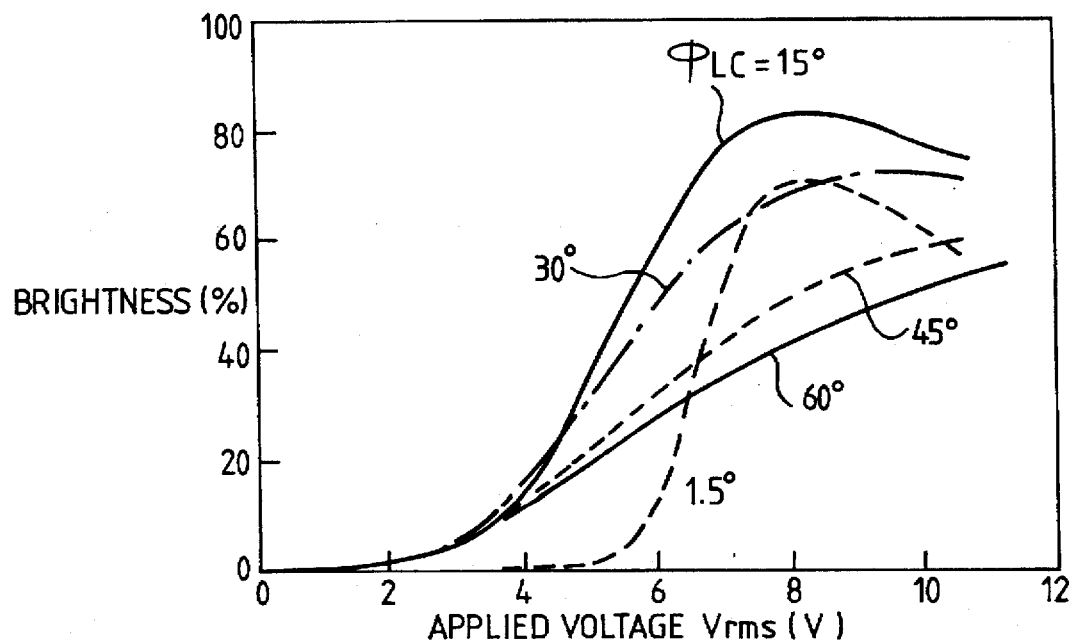
FIG. 11 is a graph illustrating the electro-optical characteristics of various embodiments with different orientation directions of the long axis of the liquid crystal molecules at the interface when the dielectric constant anisotropy is negative.

The results of the measurement of the electro-optical characteristics in these embodiments are shown in a single diagram of FIG. 11. Unlike to the case when the dielectric constant anisotropy was positive, there was a tendency for the characteristic curves of the threshold to become steep as the angle $\phi_{LC}$ was decreased. In order to provide a large voltage margin for half-tone, the angle $\phi_{LC}$ must be increased. However, there was a tendency that when the $\phi_{LC}$ was larger than 45 degrees, brightness decreased. As in the case when the dielectric constant anisotropy was positive, the optimum value of the angle $\phi_{LC}$ depends on the number of the half-tone levels to be displayed, the requirement for brightness, driving voltage, and whether or not the common electrode has a voltage applied. A designer can control the threshold characteristics in a wide range by suitably selecting the angle $\phi_{LC}$. When considering the brightness, the angle $\phi_{LC}$ is almost 45 degrees. Measurement of the visual angle characteristics revealed that, in each case, the characteristics curve changed very slightly when the visual angle was changed laterally and vertically, and the display characteristics were hardly changed, as in the first embodiment. No reversions of levels in the half-tone display (8 steps) were observed in a range ±50 degrees both laterally and vertically. The liquid crystal orientation was satisfactory, and no orientation failure domain was generated.

EMBODIMENTS 24 to 26

In these embodiments, the directions of the long axes of liquid crystal molecules and the arrangement of the polarizing plates were set to be the same as the twenty-first embodiment which produced the best characteristics among the embodiments 20 to 23 ($\phi_{LC1}=\phi_{LC2}=\phi_{P1}=15°$, and $\phi_{P2}=-75°$). Only the product, d·Δn, of the thickness of the liquid crystal composition layer d and refractive index anisotropy Δn was changed. In the twenty-fourth, twenty-fifth and twenty-sixth embodiments the thickness d of the liquid crystal composition layer were set to be 4.0, 4.9, and 7.2 μm, respectively. Thus, the product, d·Δn, was 0.1748, 0.2141, and 0.3146 μm, respectively. In these embodiments, the refractive index anisotropy Δn was a constant and only the thickness of the liquid crystal composition layer d was changed. However, as well as the other type of the liquid crystal display (such as 90 degrees twisted nematic type), the same result for the optimum brightness can be obtained even if the refractive index anisotropy $\Delta n$ is changed. Moreover, the same result can be obtained even if the liquid crystal composition layer has a positive dielectric constant anisotropy.

Figure 12A:
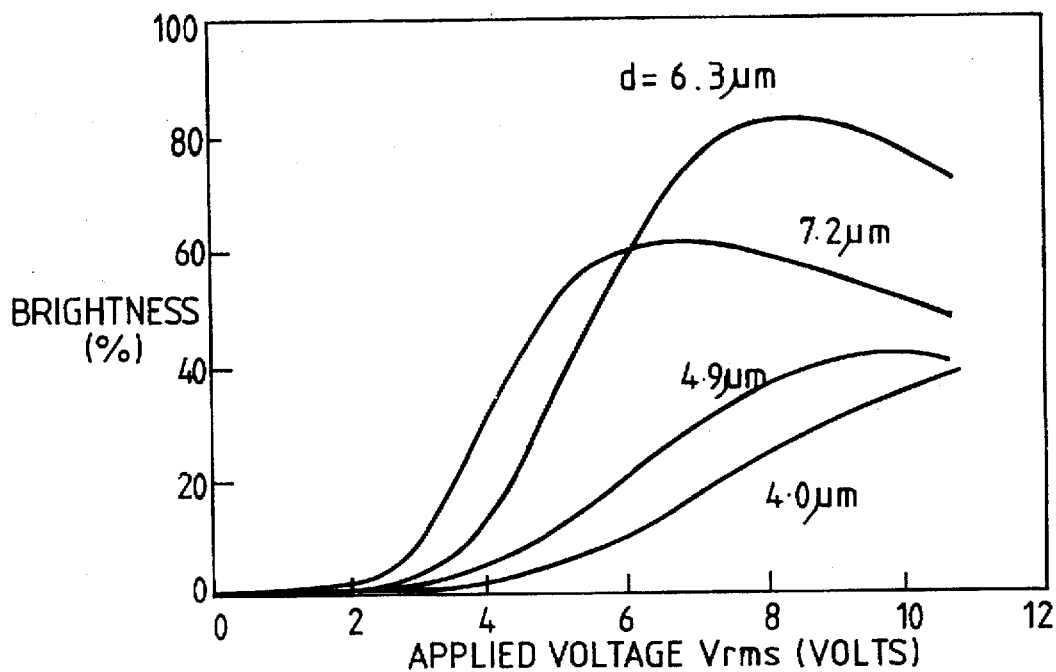
FIGS. 12(a) and 12(b) are graphs illustrating the electro-optical characteristics of various embodiments with different thicknesses d of the liquid crystal layer when the dielectric constant anisotropy is negative.
Figure 12B:
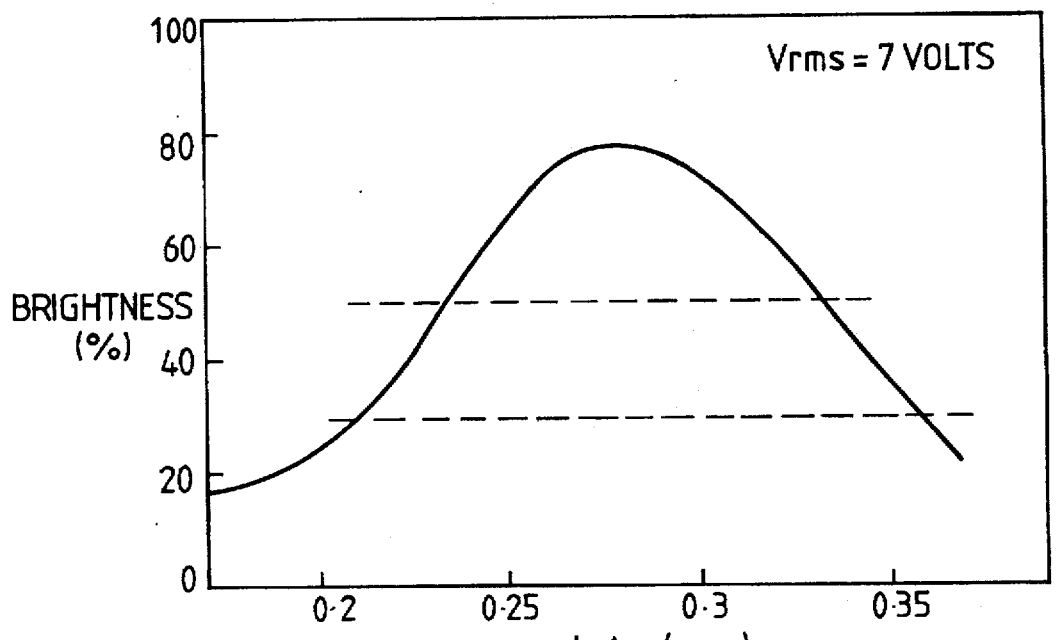

The results of the measurement in these embodiments are shown in FIG. 12. The abscissa in FIG. 12 (a) indicates applied voltages, and the abscissa in FIG. 12 (b) indicates d·$\Delta n$ with the applied voltage being a constant 7 Volts. As FIG. 12 (b) reveals, the brightness depends strongly on d·$\Delta n$ and an optimum value exists. In order to maintain a brightness of at least 30%, which is preferable for practical use, the value of d·$\Delta n$ should be between 0.21 and 0.36 µm, and further if the brightness exceeding 50% is desired, the value of d·$\Delta n$ between 0.23 and 0.33 µm must be selected. In consideration of sealing time for the liquid crystal, thickness control of the liquid crystal composition layer etc, and mass-productivity, the value for d must be at least 5.0 µm, and $\Delta n$ of almost 0.08 is preferable.

EMBODIMENTS 27 to 29

As the results of the twenty-fourth to twenty-sixth embodiments reveal, the optimum value of d·$\Delta n$ is between 0.21 and 0.36 µm, preferably between 0.23 and 0.33 µm. Since the thickness of the liquid crystal composition layer which is preferable for mass-production is at least 5.0 µm, the value of the refractive index anisotropy $\Delta n$ must be almost 0.072, preferably almost 0.066. However, the kinds of liquid crystal compounds having such an extremely low value for $\Delta n$ are very limited, and it is very difficult for them to be compatible with other characteristics required for practical use.

Therefore, a new method was considered in which d and $\Delta n$ of the liquid crystal composition layer are set rather higher than the optimum values, and an optically anisotropic medium having a lower value for phase difference Rf than the value for d·$\Delta n$ of the liquid crystal composition layer is provided. This compensates for the departure from the optimum value by the phase difference of with the liquid crystal composition layer. As the result, the effective phase difference which is generated by the combination of the liquid crystal composition layer and the optically anisotropic medium is in the optimum range between 0.21 and 0.36 µm.

In the twenty-seventh to twenty-nineth embodiments, the structure was the same as the third embodiment except as will be described. The thickness of the liquid crystal composition layers were set to be as 5.0, 5.2, and 5.5 µm, respectively. A nematic liquid crystal composition having the refractive index anisotropy $\Delta n$ of 0.072 (589 nm, 20 C.°) was used, so that the value for d·$\Delta n$ was 0.360, 0.3744, and 0.396 µm, respectively. As the brightness and color tone are higher than the preferable range between 0.21 to 0.36 µm, the liquid crystal cell is colored orange. An optically anisotropic medium 28 (see FIG. 9) of an uniaxially stretched film made from polyvinyl alcohol was laminated over the liquid crystal cell so as to compensate for the birefringent phase difference of the liquid crystal at low voltage driving condition (in these embodiments, zero volts). Therefore, $\phi_R$ was selected to be 85 degrees, being the same as $\phi_{LC1}(=\phi_{LC2})$. The phase difference Rf was 0.07, 0.08, and 0.10 µm, respectively, and the value for (d·$\Delta n$−Rf) was selected to be 0.29, 0.3044, and 0.296 µm, respectively, so as to be in the preferable range from 0.21 to 0.36 µm for the brightness and the color tone.

As the results, a bright display having the brightness exceeding 50% without coloring could be obtained.

EMBODIMENT 30

In the thirtyth embodiment, the liquid crystal composition layer in the twenty-seventh embodiment was replaced with a nematic liquid crystal composition (e.g. ZLI-4518 of Merck Co.) for which dielectric constant anisotropy $\Delta\epsilon$ was negative with a value of −2.5, and its $\Delta n$ was 0.0712 (589 nm, 20 C.°). The rest of the device was the same as the twenty-first embodiment except as will be described below. The thickness of the liquid crystal composition layers was set to be 5.5 µm. Thus, the value for d·$\Delta n$ is 0.3916 µm. An optically anisotropic medium of an uniaxially stretched film made from polyvinyl alcohol having a phase difference Rf of 0.11 µm was laminated over the liquid crystal cell so that the value for (d·$\Delta n$−Rf) became 0.2816 µm within the preferable range from 0.21 to 0.36 µm for the brightness and the color tone.

As the results, a bright display having the brightness exceeding 50% without coloring could be obtained.

EMBODIMENT 31

The structure of the thirty-first embodiment was generally the same as the fifteenth embodiment except as will be described below.

In the thirty-first embodiment $\Delta n$ of the liquid crystal composition layer was 0.072, and the gap was 7.0 µm. Therefore, d·$\Delta n$ is 0.504 µm. $\phi_{LC1}$ was 89.5 degrees, the orientation direction of the liquid crystal molecules at the upper interface and the lower interface were set so as to cross over perpendicularly to each other, and the angle, $|\phi_{LC1}-\phi_{LC2}|$, was 90 degrees. The polarizing plates were arranged perpendicularly to each other ($|\phi_{P2}-\phi_{P1}|$=90°), and the relationship with the orientation direction of the liquid crystal molecules was selected so that $\phi_{LC1}=\phi_{P1}$, so providing an optical rotatory mode. As the result, a normally open type of liquid crystal display device was obtained.

Measurement of the electro-optical characteristics in the thirty-first embodiment revealed the result that the brightness exceeded 50%, there was an extremely small difference in characteristics curve when the visual angle was changed laterally and vertically, and scarcely changed display characteristics could be obtained. The orientation of the liquid crystal was satisfactory and no orientation failure domain was generated.

EMBODIMENTS 32 and 33

The structures of the thirty-second and thirty-third embodiments were generally the same as the first embodiment except as will be described below.

In these embodiment, the polarizing plates were so arranged that the dark state was obtained when an electric field of low level, not zero, was applied. The value of $|\phi_{LC1}-\phi_{P1}|$ was set at 5 degrees in the thirty-second embodiment, and 15 degrees in the thirty-third embodiment, respectively, and the value of $|\phi_{P2}-\phi_{P1}|$ was set at 90 degrees for both thirty-second and thirty-third the embodiments.

A satisfactory display characteristic, for both brightness and visual angle was obtained, as in the other embodiments. Also, the liquid crystal orientation was satisfactory, and no orientation failure domain was generated.

EMBODIMENTS 34 and 35

The structures of the thirty-fourth and thirth-fifth embodiments were generally the same as the twenty-first embodiment except as will be described below.

In the twenty-fourth and twenty-fifth embodiments, the polarizing plates were arranged so that the dark state was obtained when an electric field of low level, not zero, was applied. The value of $|\phi_{P1}-\phi_{LC1}|$ was set at 5 degrees in the thirty-fourth embodiment and 7 degrees in the thirty-fifth embodiment, respectively, and the value of $|\phi_{P2}-\phi_{P1}|$ was set as 90 degrees for both embodiments. The thickness d of the liquid crystal composition layer was 3 μm. Therefore, d·Δn was 0.275 μm.

Figure 13A:
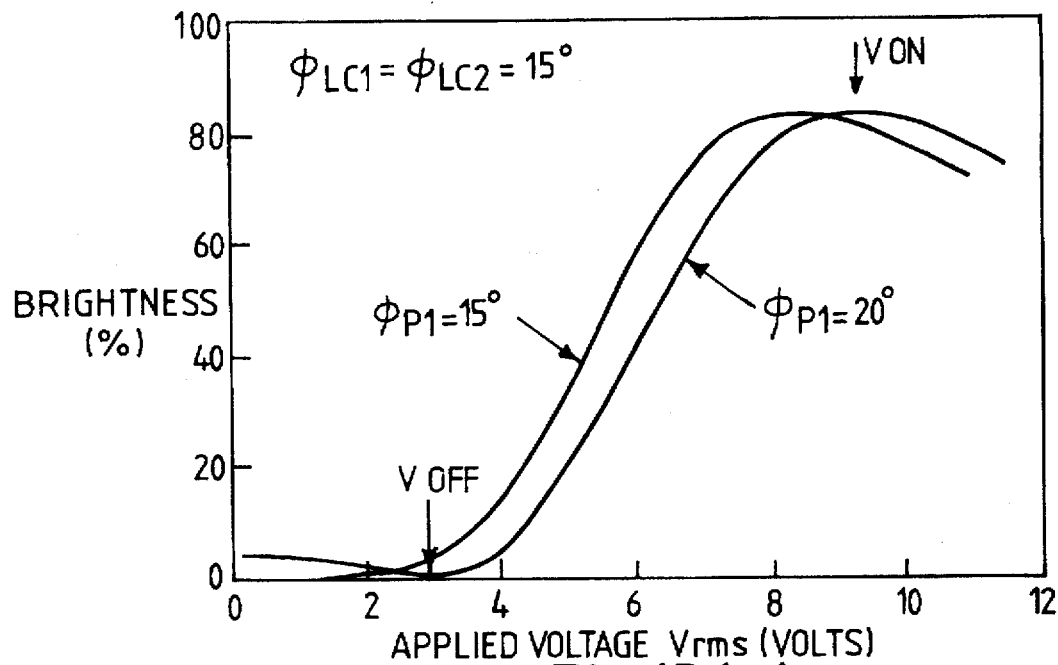
FIGS. 13(a) and 13(b) are graphs illustrating the electro-optical characteristics of embodiments in which polarizing plates are arranged so that the dark state can be obtained by applying a small non-zero electric field.
Figure 13B:
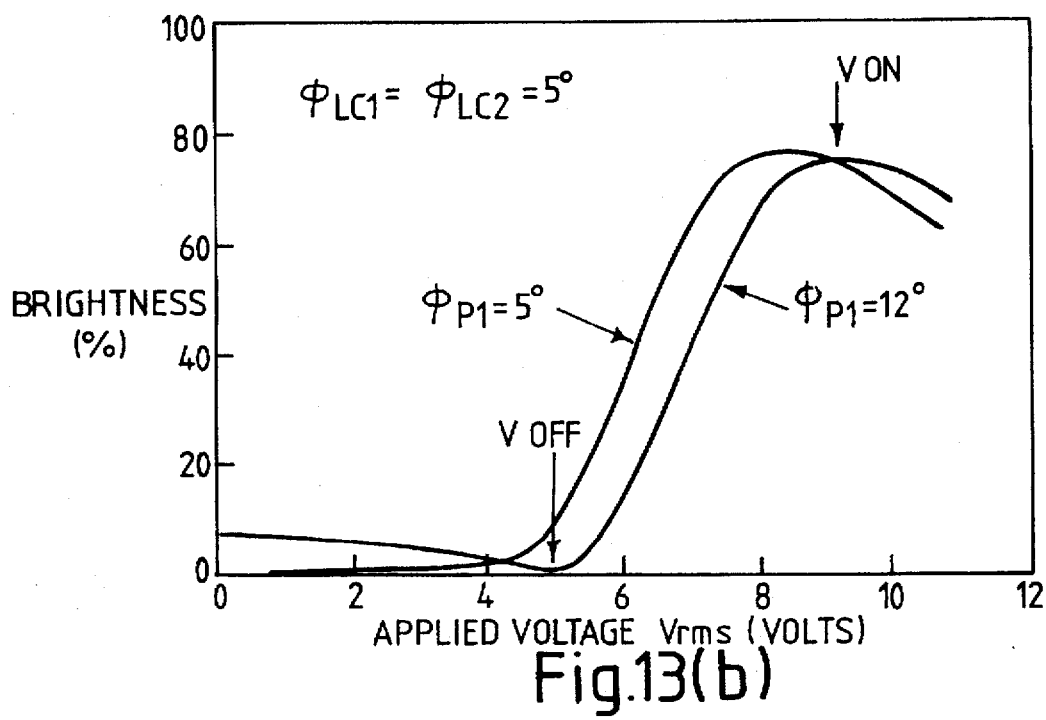

The results of measurement of the electro-optical characteristics measurement in these embodiments are shown in FIG. 13. For the thirty-fourth embodiment the voltage causing the dark state, $V_{off}$ was 3.0 Volts and the voltage causing the maximum brightness, $V_{ON}$, was 9.2 Volts. Therefore, sufficiently high contrast can be obtained if its operation is performed with the voltage between $V_{OFF}$ and $V_{ON}$. Similarly, for the thirty-fifth embodiment, $V_{OFF}$ was 5.0 Volts and $V_{ON}$ was 9.0 Volts. When it was operated with a voltage between the $V_{OFF}$ and the $V_{ON}$, suitable display characteristics for both brightness and visual angle were obtained, as in the other embodiments. The liquid crystal orientation was satisfactory and no orientation failure domain was generated.

EMBODIMENT 36

The structure of the thirty-sixth embodiment was the same as the thirty-fourth embodiment except as will be described below.

In the thirty-sixth embodiment, image signals were supplied to the signal electrode and at the same time, an alternating current at 3.0 V was applied to the common electrode. As a result, there was a reduction of the voltage which needed to be supplied to the signal electrode (8.3 V→6.2 V). As its operation was performed with the voltage between $V_{OFF}$ and $V_{ON}$, a satisfactory display characteristics in both brightness and visual angle was obtained, as in the other embodiments. The liquid crystal orientation was satisfactory and no orientation failure domain was generated.

EMBODIMENT 37

The structure of the thirty-seventh embodiment was the same as the first embodiment except as will be described below.

In the thirty-seventh embodiment, the polarizing plates were arranged so that the dark state was obtained when an electric field of low level, not zero, was applied. The value of $|\phi_{LC1}-\phi_{P1}|$ was set at 45 degrees and the value of $|\phi_{P2}-\phi_{P1}|$ was set at 90 degrees. Therefore, a bright state was obtained by applying a low voltage and dark state was obtained by applying a high voltage. The results of measurement of the voltage dependance of the brightness in this present embodiment is shown with a solid line in FIG. 14. Satisfactory display characteristics for both brightness and visual angle were obtained, as in the other embodiments. The contrast ratio was 35. The liquid crystal orientation was satisfactory, and no orientation failure domain was generated.

EMBODIMENT 38

With the structure of the thirty-seventh embodiment, a birefringent medium (uniaxially stretched polyvinyl alcohol film) was inserted between the two polarizing plates for compensating interface residual phase difference. The stretched direction of the film $\phi_R$ was −45 degrees, and the stretched direction crossed over perpendicularly to the transmission axis of the polarized plate. The phase difference $R_f$ was 15 nm.

Figure 14:
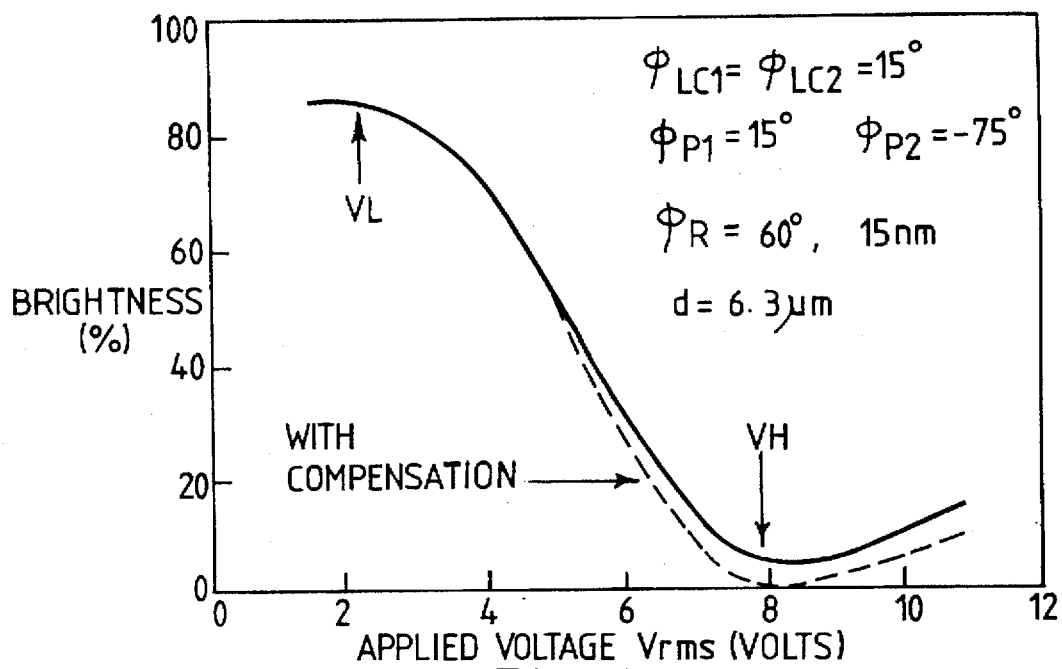
FIG. 14 is a graph illustrating the characteristics of a normally open type device and the characteristics when its residual phase difference at the interface is compensated.

As shown by a dotted line in FIG. 14, the light leakage at high voltage was suppressed more than in the thirty-seventh embodiment, and the contrast ratio was improved to 150. In accordance with the present invention, it is possible to provide:

i) firstly, a thin film transistor type liquid crystal display device having a high contrast without using a transparent electrode which can be mass-produced with high yields at low cost by using inexpensive manufacturing facilities;

ii) secondly, a thin film transistor type liquid crystal display device having a satisfactory visual angle characteristics which can easily display multiple-tone images;

iii) thirdly, a thin film transistor type liquid crystal display device having a large margin for the processes of the liquid crystal orientation and materials, such a device can have a large aperture factor, improved light transmission, and brighter images;

iv) fourthly, a thin film transistor type liquid crystal display devices having a large aperture factor, improved light transmission, and brighter images by providing simple structures for the thin film transistor structure.

These advantages may be achieved independently in combination depending on the structure of the device.

What is claimed is:

1. A liquid crystal display device including:
   a pair of substrates;
   a liquid crystal layer interposed between said pair of substrates;
   common electrode lines formed on one substrate of said pair of substrates;
   pixel electrode lines formed on said one substrate and disposed between said common electrode lines;
   a nonconductive film in contact with said liquid crystal layer; and
   a color filter formed on said nonconductive film;
   wherein one surface of said nonconductive film adjacent to said color filter flattens said color filter and another surface of said nonconductive film adjacent to said liquid crystal layer controls an orientation of liquid crystal molecules of said liquid crystal layer; and
   wherein an electric field is generated in said liquid crystal layer by applying a voltage between said pixel electrode lines and said common electrode lines.

2. A liquid crystal display device according to claim 1, wherein said nonconductive film is a single layer film.

3. A liquid crystal display device according to claim 1, wherein said nonconductive film is an organic polymer.

4. A liquid crystal display device according to claim 3, wherein said nonconductive film includes a polyimide.

5. A liquid crystal display device according to claim 4, wherein said nonconductive film includes an epoxy resin.

6. A liquid crystal display device according to claim 1, wherein a pretilt angle of liquid crystal molecules of said liquid crystal layer with respect to said one substrate is not more than 4°.

7. A liquid crystal display device according to claim 1, wherein a dielectric constant anisotropy of said liquid crystal layer is positive, and an absolute value of an angle between components of said electric field in a direction parallel to said one substrate and a direction of orientation of liquid crystal molecules on said pair of substrates is less than 90° but not less than 45°.

8. A liquid crystal display device according to claim 1, wherein a dielectric constant anisotropy of said liquid crystal layer is negative, and an absolute value of an angle between components of said electric field in a direction parallel to said one substrate and direction of orientation of liquid crystal molecules on said pair of substrates is less than 45°, but not less than 0°.

9. A liquid crystal display device according to claim 1, wherein a product of a thickness of said liquid crystal layer and a refractive index anisotropy of said liquid crystal layer is between 0.21 µm and 0.36 µm.

10. A liquid crystal display device comprising:

a pair of substrates;

a liquid crystal layer interposed between said pair of substrates;

signal electrode lines and scanning electrode lines formed on one substrate of said pair of substrates and crossing each other in a matrix form, wherein a plurality of pixels are formed by adjoining said signal electrode lines and said scanning electrode lines;

wherein each pixel of said pixels comprises:

a semiconductor switching element formed proximate to a crossing point between a corresponding signal electrode line and a scanning electrode line;

a plurality of common electrode lines formed on said one substrate and having a connection portion connecting one of said plurality of common electrode lines to another of said plurality of over more than one of said plurality of pixels; and at least one pixel electrode line formed on said one substrate, said at least one pixel electrode line being connected to said semiconductor switching element and disposed between said plurality of common electrode lines;

wherein two common electrode lines of said plurality of common electrode lines are disposed adjacent to one of said signal electrode lines so that said one of said signal electrode lines is disposed between said two common electrode lines.

11. A liquid crystal display device comprising:

a pair of substrates;

a liquid crystal layer interposed between said pair of substrates;

signal electrode lines and scanning electrode lines formed on one of said pair of substrates and crossing each other in a matrix form, wherein a plurality of pixels are formed by adjoining said signal electrode lines and said scanning electrode lines;

wherein each pixel of said pixels comprises:

a semiconductor switching element formed proximate to a crossing point between a corresponding signal electrode line and a scanning electrode line;

at least one common electrode line of a plurality of common electrode lines formed on said one substrate and having a connection portion connecting one of said plurality of common electrode lines to another of said plurality of over more than one of said plurality of pixels; and at least one pixel electrode line formed on said one substrate, said at least one pixel electrode line being connected to said semiconductor switching element and disposed between said plurality of common electrode lines;

wherein at least one of said plurality of common electrode lines is disposed closer to one of said signal electrode lines than to said at least one pixel electrode line within said pixel so that said one of said signal electrode lines is disposed between two of said plurality of common electrode lines.

12. A liquid crystal display device including:

a pair of substrates;

a liquid crystal layer interposed between said pair of substrates;

signal electrode lines and scanning electrode lines formed on said one substrate and crossing each other in a matrix form, wherein a plurality of pixels are formed by adjoining said signal lines and said scanning lines;

wherein each pixel of said pixels comprises:

a semiconductor switching element formed proximate to a crossing point of a corresponding signal electrode line and scanning electrode line;

a common electrode line of a plurality of common electrode lines formed on said one substrate and connected to another common electrode line of said plurality of common electrode lines over more than one of said plurality of pixels by a connection portion of said plurality of common electrode lines; and a pixel electrode line formed on said one substrate and extending substantially in parallel to said common electrode line, said pixel electrode line being coupled to said semiconductor switching element, said pixel electrode line including at least first and second electrically connected portions;

wherein an electric field is generated in said liquid crystal layer by applying a voltage between said common electrode line and said pixel electrode line, at least one first portion of said pixel electrode line being disposed in overlapping relation to said connection portion of said common electrode lines and being insulated therefrom, and a capacitance being formed between said connection portion of said common electrode lines and said at least one first portion of said pixel electrode line.

13. A liquid crystal display device including:

a pair of substrates;

a liquid crystal layer interposed between said pair of substrates;

signal electrode lines and scanning electrode lines formed on said one substrate and cross each other in a matrix form, wherein a plurality of pixels are formed by adjoining said signal lines and said scanning lines;

wherein each pixel of said pixels comprises:

a semiconductor switching element formed proximate to a crossing point of a corresponding signal electrode line and scanning electrode line;

common electrode lines formed on said one substrate and connected to each other over more than one of said plurality of pixels by a connection portion of said common electrode lines;

at least one pixel electrode line formed on said one substrate and being disposed between said common electrode lines, said at least one pixel electrode line, being coupled to said semiconductor switching element, said at least one pixel electrode line including at least first and second electrically connected portions; and at least one first portion of said at least one pixel electrode line being disposed in overlapping relation to said connection portion of said common electrode lines and being insulated therefrom, and a capacitance being formed between said connection portion of said common electrode lines and said at least one first portion of said at least one pixel electrode line.

* * * * *